United States Patent
Shiga et al.

(10) Patent No.: US 6,608,653 B2
(45) Date of Patent: Aug. 19, 2003

(54) ACTIVE MATRIX LIQUID CRYSTAL DISPLAY DEVICE HAVING REDUCED LEAK CURRENT AND SWITCHING ELEMENT USED THEREIN

(75) Inventors: Shunsuke Shiga, Tokyo (JP); Fuminori Tamura, Tokyo (JP); Shouichi Kuroha, Tokyo (JP); Makoto Watanabe, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 09/995,516

(22) Filed: Nov. 28, 2001

(65) Prior Publication Data

US 2002/0113914 A1 Aug. 22, 2002

(30) Foreign Application Priority Data

| Nov. 30, 2000 | (JP) | 2000/365435 |
| Oct. 19, 2001 | (JP) | 2001/321810 |
| Nov. 21, 2001 | (JP) | 2001/356206 |

(51) Int. Cl.$^7$ ............................................. G02F 1/136
(52) U.S. Cl. ............................. 349/43; 349/42; 349/46; 438/30
(58) Field of Search ............................. 349/43, 42, 46; 438/30

(56) References Cited

U.S. PATENT DOCUMENTS

| 5,917,564 A | * | 6/1999 | Kim et al. ................. 349/46 |
| 6,404,474 B1 | * | 6/2002 | Watanabe et al. .......... 349/141 |
| 2002/0025591 A1 | * | 2/2002 | Ohnuma et al. ............. 438/30 |

FOREIGN PATENT DOCUMENTS

| JP | 7-122754 | 5/1995 |
| JP | 11-26768 | 1/1999 |

* cited by examiner

*Primary Examiner*—Julie Ngo
(74) *Attorney, Agent, or Firm*—Choate, Hall & Stewart

(57) ABSTRACT

A thin film transistor is designed in such a manner that a semiconductor region includes source and drain electrodes in a channel width direction and further, a planar source-side overlap area constructed by a gate electrode, the source electrode and the semiconductor region and a planar drain-side overlap area constructed by the gate electrode, the drain electrode and the semiconductor region exist. An optimal overlap length of one of the source-side and drain-side overlap areas in a channel length direction is determined, for instance, to be 4 $\mu$m, for a light incident on a channel portion of the thin film transistor to have a light intensity below or equal to 0.2% of a light intensity of the backlight incident toward the thin film transistor, thereby reducing a light-induced OFF leak current sufficiently and further improving flickering and display uniformity.

20 Claims, 17 Drawing Sheets

ACTIVE MATRIX LIQUID CRYSTAL DISPLAY DEVICE HAVING REDUCED LEAK CURRENT AND SWITCHING ELEMENT USED THEREIN

BACKGROUND OF THE INVENTION

1. Field of the Invention

The present invention relates to an active matrix liquid crystal display device and a switching element used therein, and, more particularly, to an active matrix liquid crystal display device having an excellent display uniformity in addition to low level flickering and a switching element used in the display device.

2. Description of the Prior Art

Thin film transistors (TFTs) are widely used as switching elements in drive circuits for various devices. The use of TFTs in active matrix liquid crystal display devices is particularly remarkable. In case where the semiconductor region of a TFT is formed of amorphous silicon, which is often used in a liquid crystal display or the like, incident light from a backlight or a light source for display generates photocarriers in the semiconductor region. As the photocarriers travel in a channel portion, a light-induced OFF leak current is produced. The light-induced OFF leak current lowers the pixel potential, thus resulting in various undesirable shortcomings, such as reduced luminance of a module, uneven display and flickering.

Some schemes of suppressing the light-induced OFF leak current are disclosed in Japanese Patent Laid-Open No. 26768/1999 and Japanese Patent Laid-Open No. 122754/1995. FIGS. 1 and 2 illustrate a TFT of an active matrix liquid crystal display device according to the art described in Japanese Patent Laid-Open No. 26768/1999. FIG. 1 is a plan view of the TFT, and FIG. 2 is a cross-sectional view of a portion near the TFT in FIG. 1 when the TFT is cut in the channel length direction.

It should be noted that although the plan view shown in FIG. 1 illustrates a pixel of an active matrix substrate operating in a vertical electric field mode, the inventor of the present invention intends to primarily explain the layout pattern of TFT, and therefore, the layout pattern of components other than TFT is only an exemplified one, in other words, not limited to that of the vertical field type of active matrix substrate. For that reason, instead of a vertical field type of active matrix substrate, in order to explain a path of light 119 incident on TFT hereinafter, FIG. 2 illustrates a cross sectional view of an active matrix substrate operating in a lateral electric field mode, which is generally more sensitive to an incident light than the vertical field type of active matrix substrate.

In FIG. 2, a gate line 101, a common electrode 104, a first insulating film 109, an amorphous silicon film 107, an n+amorphous silicon film 108, a source (pixel) electrode 105 and a drain electrode 106 are formed on a first glass substrate 100. Further, a second insulating film 110 and a first alignment film 111 are formed over the gate line, films and electrodes, thereby completing a thin-film-transistor substrate (hereinafter referred to as "TFT substrate") 130.

An opposing substrate 140 is formed so as to face the TFT substrate 130 interposing a liquid crystal 116 therebetween. The opposing substrate 140 has a second glass substrate 112 and a light shielding film 113, a color layer 114, a third insulating film 115 and a second alignment film 117 formed in the name order on that side of the second glass substrate 112 which faces the first glass substrate 100.

Furthermore, a first polarizer 121 is adhered to the bottom side of the first glass substrate 100 and a second polarizer 122 to the bottom side of the second glass substrate 112, thereby completing a liquid crystal display panel 150.

As parts of the semiconductor region 107 over the gate line 101, which is sandwiched between the source electrode 105 and the drain electrode 106, are cut away as shown in FIG. 1, the influence of the light that enters the back channel along a path 1 in FIG. 2 is reduced.

FIG. 3 is a cross-sectional view of a TFT of an active matrix liquid crystal display device according to the art described in Japanese Patent Laid-Open No. 122754/1995. Same reference numerals are given to those materials and components, which are the same as those shown in FIG. 2. As a gate electrode is formed so that the width α of the gate electrode in the channel length direction becomes equal to or greater than four times the distance d from the gate line 101 to the light shielding film on the opposing substrate side as shown in FIG. 3, the light that enters the back channel along a path 1 in FIG. 3 receiving one time reflection is suppressed.

In case of TFTs which are used in a liquid crystal display panel for a monitor, an on-board display or the like, the backlight luminance is increased to meet the demand for high luminance display, the light-induced OFF leak current generated in the semiconductor region by incident light cannot be solved by the existing techniques alone. In case of a panel, which is driven in lateral electric field mode, the issue is more critical because the aperture ratio is low and the backlight luminance should be set higher than that of a TN type, which is driven by a longitudinal electric field.

The above-described conventional methods for reducing light-induced OFF leak current are insufficient to suppress the light-induced OFF leak current and further suppression of light-induced OFF leak current needs to be carried out.

The insufficient effect obtained by employing the above-described conventional methods will be discussed below in more detail. In the case where a double-layer Cr or multi-layer Cr having high reflectance is used as a light shielding film on the opposing substrate, the amount of light reflected by a part of the light shielding film on the opposing substrate is increased relative to the backlight incident toward the opposing substrate from the TFT substrate. Therefore, the art described in Japanese Patent Laid-Open No. 26768/1999 can demonstrate a prominent effect in reducing light-induced OFF leak current by reducing the area of a semiconductor region that receives the reflected light, and the art described in Japanese Patent Laid-Open No. 122754/1995 can demonstrate a prominent effect by widening the gate electrode width to reduce light incident on the back channel accompanied by the reduction of the light itself that is reflected by the light shielding film. However, in the case where a low-reflectance resin which is often used in an active matrix liquid crystal display device driven in a lateral electric field mode or the like is used as a light shielding film on the opposing substrate, since the very amount of the light reflected by the light shielding film reduces because of the low reflectance of the light shielding film, the effect in reducing light-induced OFF leak current becomes relatively smaller, in other words, does not influence seriously even when the above-described two schemes are employed in the device.

Another reason why the above-described two schemes cannot decrease the light-induced OFF leak current so much is that the backlight is reflected between the drain of TFT and the gate electrode multiple times while penetrating through the semiconductor region as indicated by a path 2 in FIG. 2, thereby allowing some light to enter the front channel. Therefore, a new technique is required to suppress the light-induced OFF leak current caused by a light incident along the path 2.

SUMMARY OF THE INVENTION

Accordingly, it is an object of the invention to provide an active matrix liquid crystal display device that has less flickering and an excellent uniformity of display as a result of reduction of leak current, which generates problems in the conventional active matrix liquid crystal display device, caused by the light incident on transistors. It is another object of the invention to provide a switching element that has less flickering and an excellent uniformity of display and then, to provide a display device employing such switching elements.

An active matrix liquid crystal display device according to the invention has the following fundamental structure.

The active matrix liquid crystal display device comprises a thin-film-transistor array substrate, an opposing substrate disposed to face the thin-film-transistor array substrate and a liquid crystal sandwiched between the thin-film-transistor array substrate and the opposing substrate.

The thin-film-transistor array of the above-described display device has thin film transistors formed on one surface of a first substrate and a polarizer formed on the other surface of the first substrate, each of the thin film transistors including a semiconductor region formed on an insulating film covering a gate electrode formed on the first substrate, and a source electrode and a drain electrode formed apart from each other on both end portions of the semiconductor region so as to partly overlap the semiconductor region and extending on the insulating film, the source electrode and the drain electrode being formed in such a manner that widths of the source electrode and the drain electrode in a channel width direction are included in a width of the semiconductor region in the channel width direction, while both a planar source-side overlap area constructed by the gate electrode, the source electrode and the semiconductor region and a planar drain-side overlap area constructed by the gate electrode, the drain electrode and the semiconductor region are provided such that an optimal overlap length of one of the source-side and the drain-side overlap areas in the channel length direction is determined for a light incident on a channel portion of each of the thin film transistors to have a light intensity of below or equal to 0.2% of a light intensity of a backlight incident on the first substrate.

A first preferable application form of the active matrix liquid crystal display device of the invention is constructed so that the width of the semiconductor region of each of the thin film transistors in the channel length direction is made wider than that of the gate electrode in the channel length direction and the semiconductor region is formed to extend wider than the gate electrode in the channel length direction.

A second preferable application form of the active matrix liquid crystal display device of the invention is constructed so that the width of the semiconductor region of each of the thin film transistors in the channel length direction is made narrower than that of the gate electrode in the channel length direction and the semiconductor region is formed to be included within the gate electrode in the channel length direction.

A switching element according to the invention has the following fundamental structure.

The switching element comprises a gate electrode formed on a surface of a substrate, an insulating film formed on the substrate and the gate electrode, and a semiconductor region formed on the insulating film and located over the gate electrode, and a source electrode and a drain electrode formed apart from each other on both end portions of the semiconductor region so as to partly overlap the semiconductor region and extending on the insulating film.

In the above-described construction of the switching element, the source electrode and the drain electrode are formed in such a manner that widths of the source electrode and the drain electrode in a channel width direction are included in a width of the semiconductor region in the channel width direction, while both a planar source-side overlap area constructed by the gate electrode, the source electrode and the semiconductor region and a planar drain-side overlap area constructed by the gate electrode, the drain electrode and the semiconductor region are provided such that an optimal overlap length of one of the source-side and the drain-side overlap areas in the channel length direction is determined for a light incident on a channel portion of each of the thin film transistors to have a light intensity of below or equal to 0.2% of a light intensity of a backlight incident on the substrate.

A first preferable application form of the switching element of the invention is constructed so that the width of the semiconductor region of the switching element is made wider than that of the gate electrode in the channel length direction and the semiconductor region is formed to extend wider than the gate electrode in the channel length direction.

A second preferable application form of the switching element of the invention is constructed so that the width of the semiconductor region of the switching element in the channel length direction is made narrower than that of the gate electrode in the channel length direction and the semiconductor region is formed to be included within the gate electrode in the channel length direction.

DETAILED DESCRIPTION OF THE PREFERRED EMBODIMENTS

An active matrix liquid crystal display device and a switching element according to preferred embodiments of the invention will now be described in detail with reference to the accompanying drawings. Although the following description of the embodiments describes, as a typified display device, a lateral electric field type liquid crystal display device which generally uses high-luminance backlight light to acquire the desired luminance because of a low aperture ratio, and applies an electric field in parallel to a glass substrate, the invention can also be applied to a longitudinal electric field type liquid crystal display device which applies an electric field perpendicular to a glass substrate.

(First Embodiment)

The first embodiment of the invention will be explained with reference to the accompanying drawings.

Figure 1:
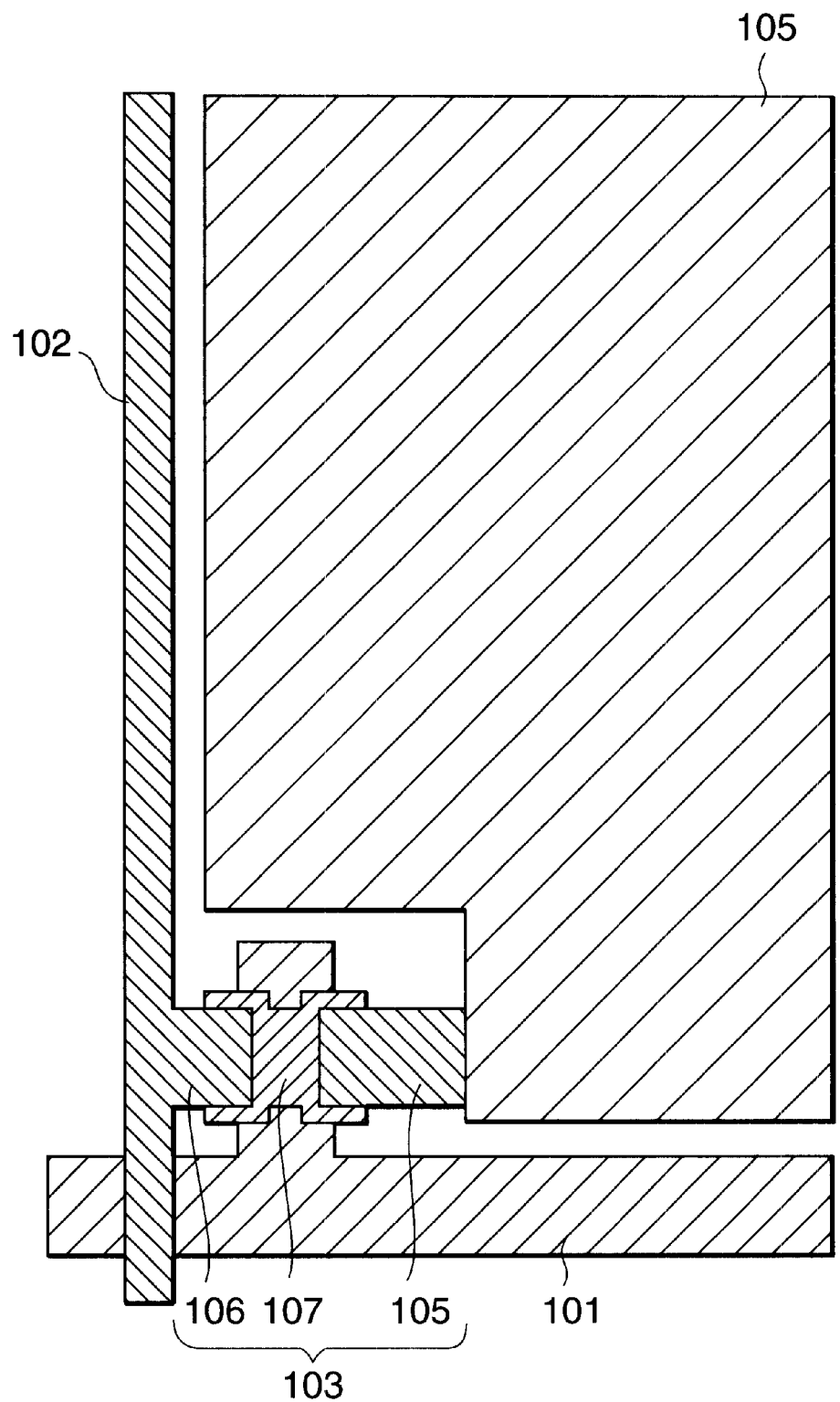
FIG. 1 is a plan view of a unit pixel of a thin-film-transistor array substrate to be figured to explain a related art.
Figure 2:
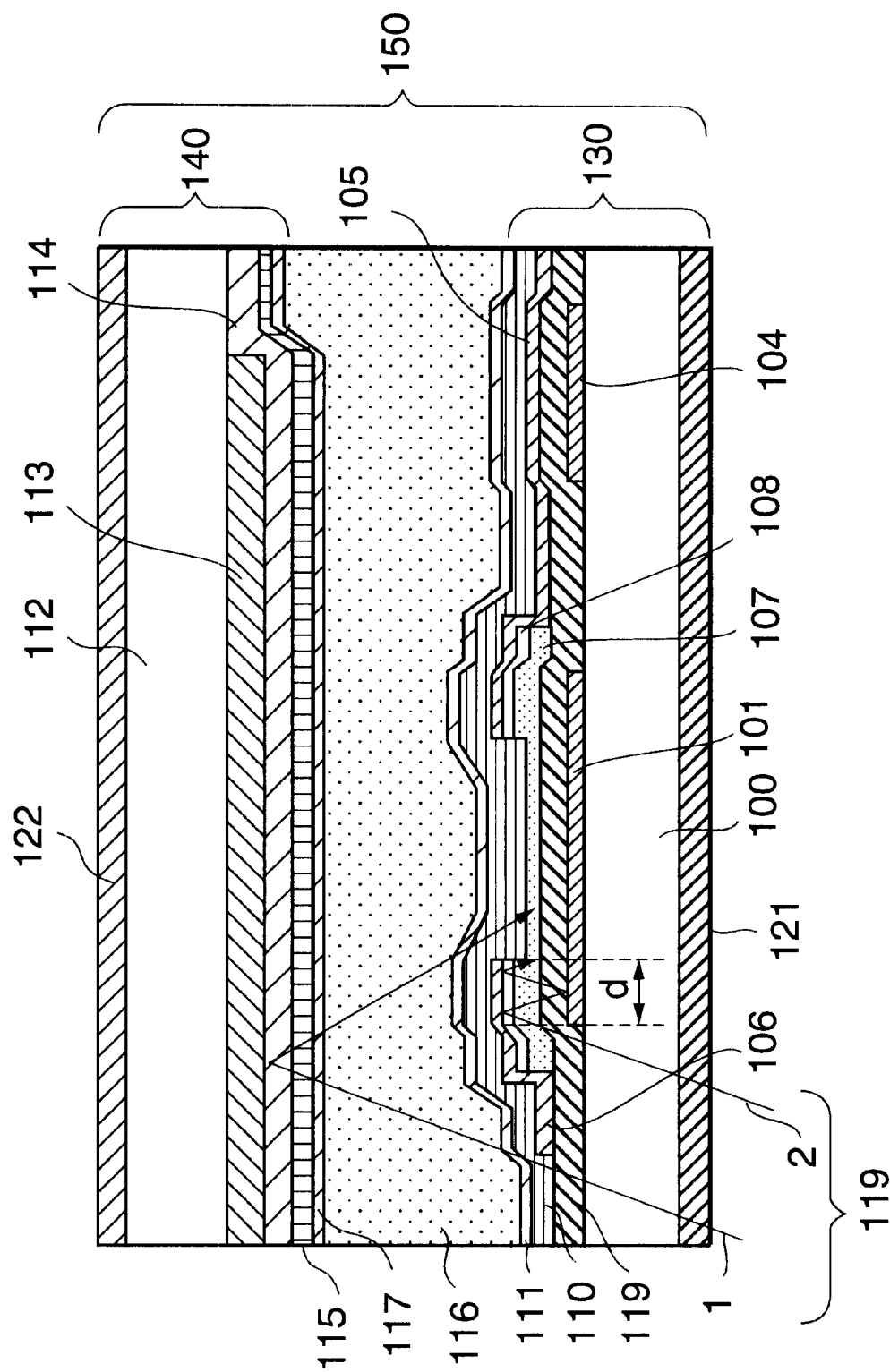
FIG. 2 is a cross-sectional view of a thin film transistor of FIG. 1.
Figure 3:
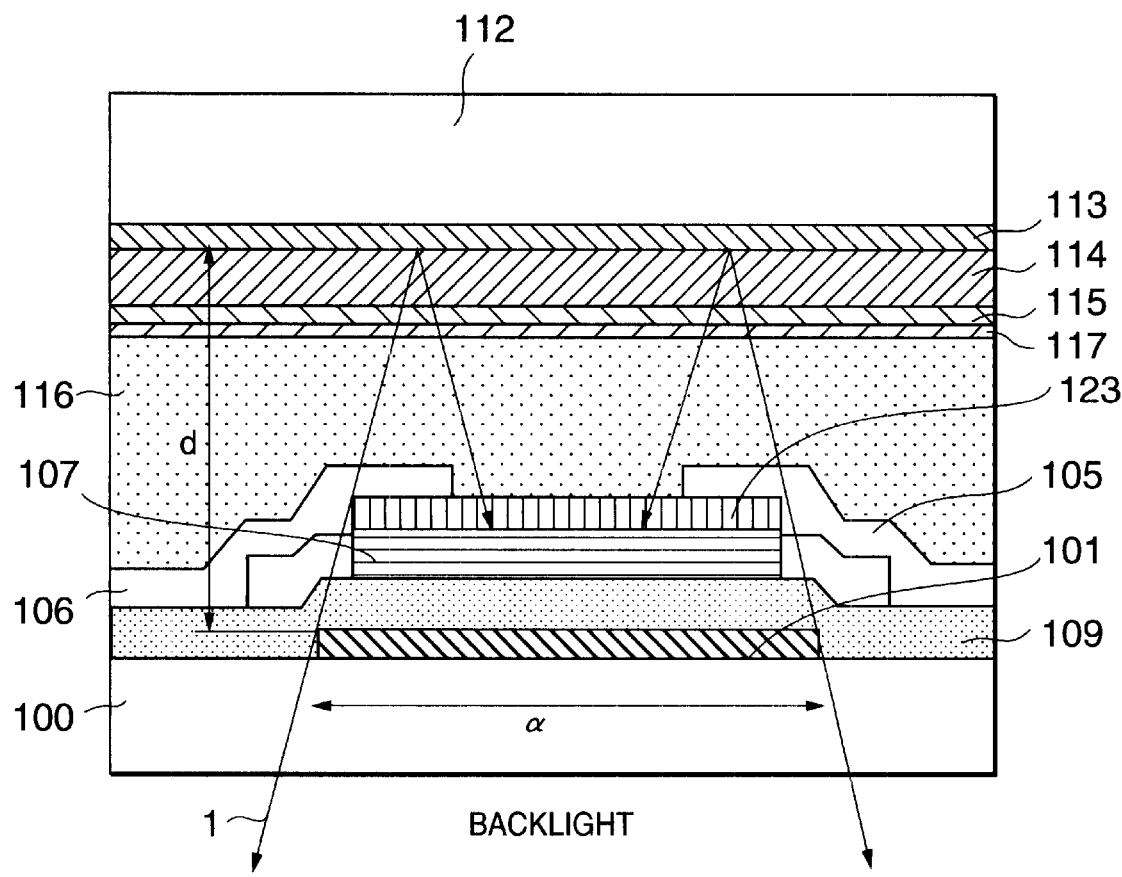
FIG. 3 is a cross-sectional view of a thin film transistor portion to be figured to explain another related art.
Figure 4:
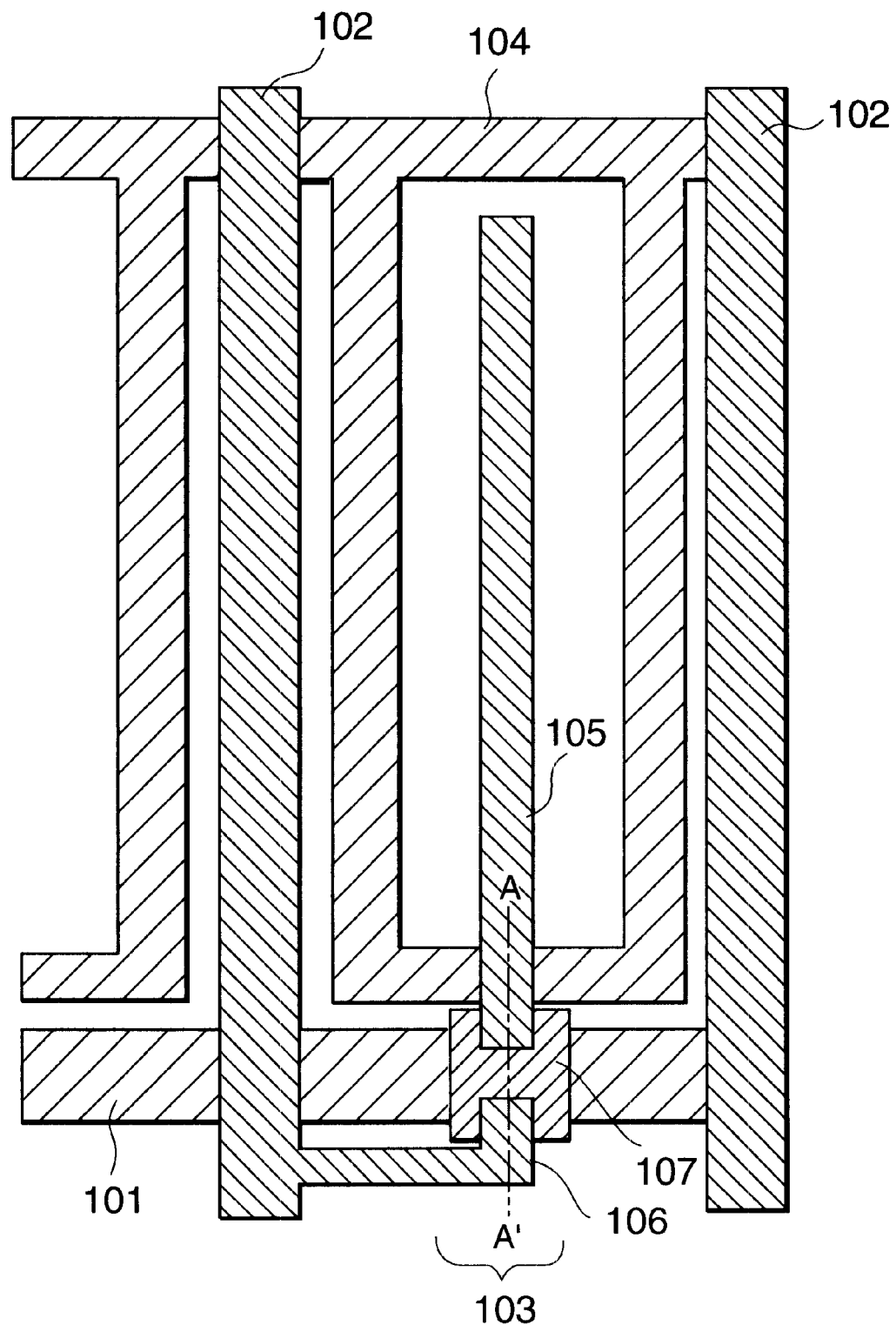
FIG. 4 is a plan view of a unit pixel of a thin-film-transistor array substrate employed as a first embodiment of the invention.
Figure 5:
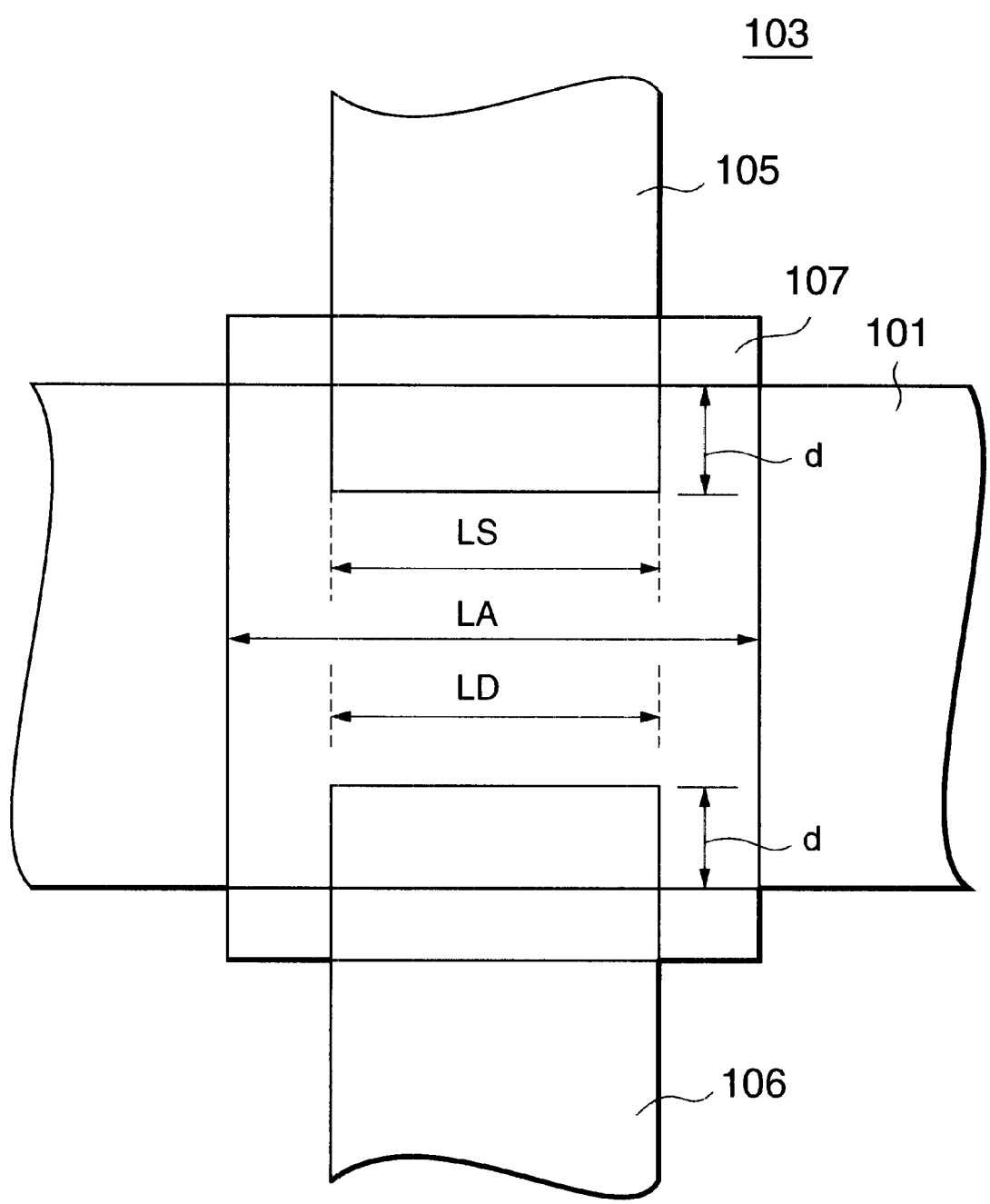
FIG. 5 is a plan view of a thin film transistor portion illustrating the first embodiment of the invention.
Figure 6:
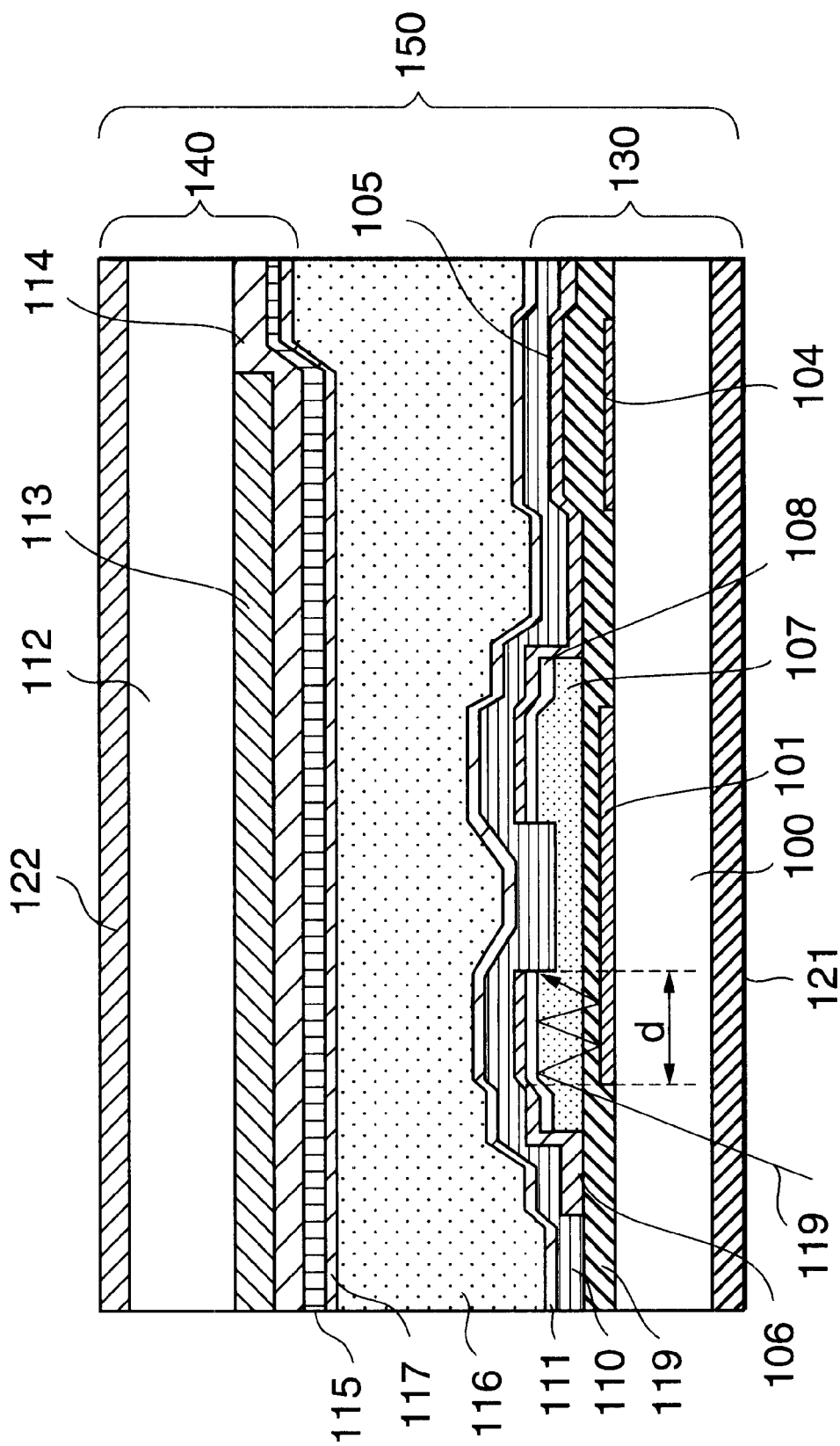
FIG. 6 is a cross-sectional view taken along A–A" in FIG. 4.

FIG. 4 is a plan view of a unit pixel of a thin-film-transistor array substrate 130 of an active matrix liquid crystal display device according to the first embodiment, and shows the portion of the device figured on the lower side of the cross-sectional view of FIG. 6. FIG. 5 is an enlarged plan view of a thin film transistor portion of each unit pixel. FIG. 6 is a cross-sectional view taken along A–A' in FIG. 4, also illustrating the portion of the device opposite to the thin-film-transistor array substrate 130.

As shown in FIGS. 4 through 6, the active matrix liquid crystal display device according to the first embodiment of the invention has a overall construction comprising a thin-film-transistor array substrate (hereinafter referred to as TFT substrate) 130, a transparent opposing substrate 140 provided apart from and in parallel to the TFT substrate 130, and a liquid crystal 116 interposed between the TFT substrate 130 and the opposing substrate 140 in a sealed form.

As shown in FIGS. 4 to 6, the thin film transistor comprises a first glass substrate 100, agate line 101, an amorphous silicon (hereinafter, a hydrogen-containing amorphous silicon is denoted by a-Si:H) film 107, an n⁺ amorphous silicon film 108, a drain line 102, a source (pixel) electrode 105, a common electrode 104 and a drain electrode 106. The drain electrode 106 is electrically connected to the drain line 102. A plurality of unit pixels are formed in the areas surrounded by the gate lines 101 and the drain lines 102 and disposed in a form arrayed in the horizontal direction and vertical direction on FIG. 4. One end of the source (pixel) electrode 105 is connected to the n⁺ amorphous silicon film 108 of a thin film transistor (TFT) 103 serving as a source electrode, and the portion of the source (pixel) electrode 105 extending in parallel to the common electrode 104 serves as a pixel electrode. The portion of the gate line 101 overlapping the amorphous silicon film 107 serves as the gate electrode of the TFT 103.

Figure 7:
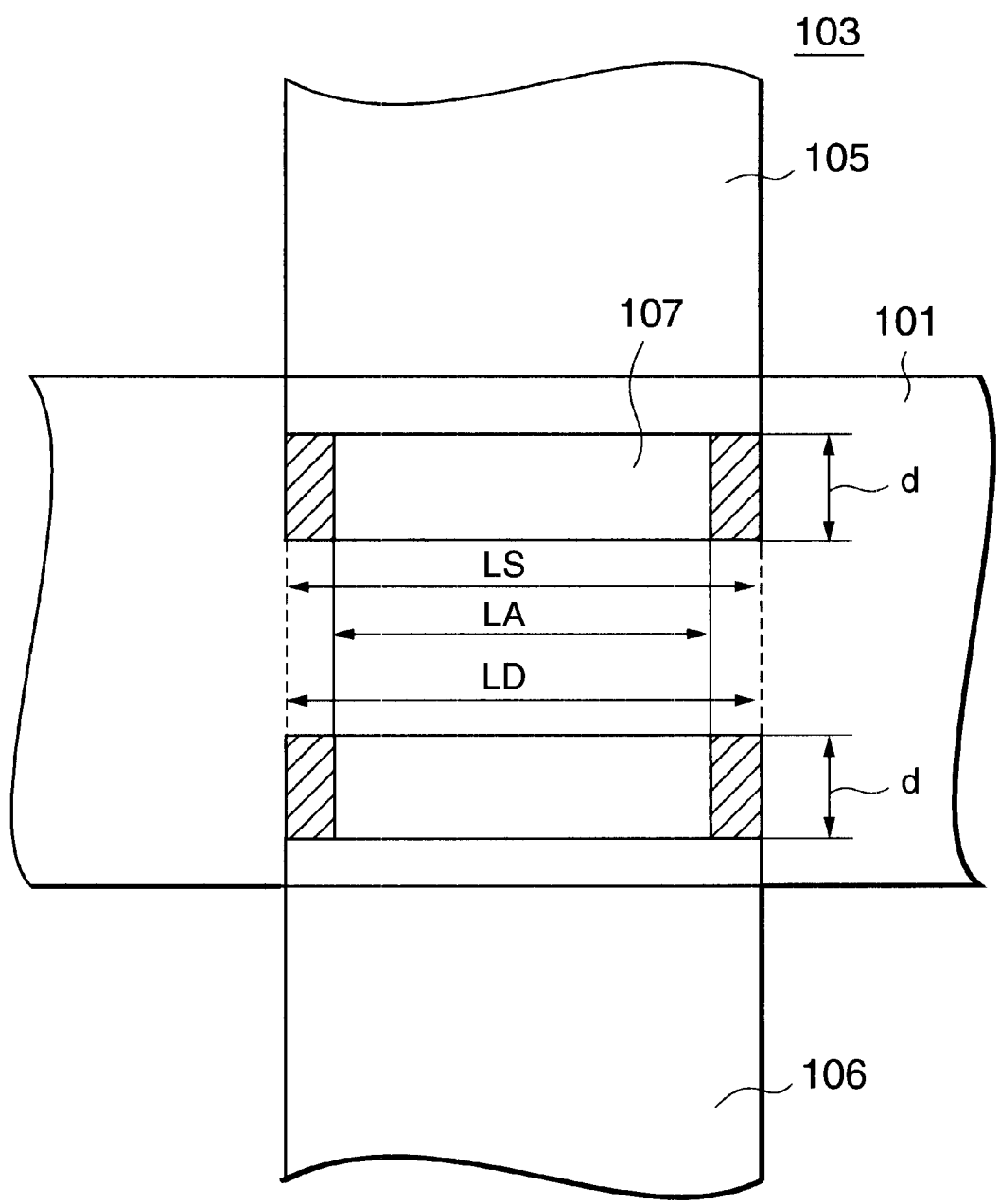
FIG. 7 is an explanatory diagram for indicating that a light is reflected and finally reaches the channel portion of a thin film transistor.

FIG. 7 shows a TFT having a structure that oblique light from the backlight located opposite to the liquid crystal 116 enters the TFT substrate 130 and is reflected entering the front channel portion easily. In this case, the drain electrode 106 or the source (pixel) electrode 105 of the TFT is formed so that the width thereof becomes wider than that of the amorphous silicon film 107, in other words, so that the area that the amorphous silicon film does not exist under the electrode in the channel width direction exists corresponding to the area of the drain electrode 106 or the source (pixel) electrode 105 extending over the amorphous silicon film in the channel width direction. Therefore, light entering the crosshatched area having a relatively low optical absorption (due to no optical absorption by the amorphous silicon film) obliquely from underneath with respect to the gate line 101 is reflected at the electrode and easily reaches the channel portion.

For the aforementioned reason, the invention has a basic construction that the drain electrode 106 or the source (pixel) electrode 105 constituting the TFT is included in the amorphous silicon film 107 in the channel width direction as shown in FIG. 5. Specifically, the TFT 103 in FIG. 5 is formed so as to satisfy the following inclusion relation:

$$[LS \subset LA][LD \subset LA] \qquad (1)$$

where LD is the width of the drain electrode 106 in the channel width direction, LS is the width of the source electrode 105 in the channel width direction, and LA is the width of the amorphous silicon film 107 in the channel width direction.

A method of manufacturing the active matrix liquid crystal display device according to the first embodiment will be explained with reference to FIGS. 4 through 6.

First, a Cr film is deposited on a first glass substrate 100 by sputtering and is selectively etched to thereby form a gate line 101 and a common electrode 104. Then, a silicon nitride film is deposited on the surface including the gate line 101 by CVD (Chemical Vapor Deposition), thus forming a first insulating film 109. Then, an amorphous silicon film 107 and an n⁺ amorphous silicon film 108 are sequentially deposited on the first insulating film 109 by CVD as a laminated film, followed by the patterning of the laminated film patterned so as to partially overlap the gate line 101. Next, a metal film made of Cr or the like is deposited on and patterned to form a source (pixel) electrode 105 and a drain electrode 106 so as to partially overlap the amorphous silicon film 107.

Then, using the drain electrode 106 and the source (pixel) electrode 105 as an etching mask, the n⁺ amorphous silicon film 108 on the amorphous silicon film 107 is removed to avoid short-circuiting of the drain electrode 106 and the source (pixel) electrode 105 on the amorphous silicon film 107, thereby completing the formation of the TFT 103. Thereafter, a second insulating film 110 is formed to cover and protect the TFT 103, the drain line 102 and the source (pixel) electrode 105, and the TFT substrate 130 is completed. An alignment film made of an organic material for aligning the liquid crystal 116 is coated on the second insulating film 110 followed by alignment processing, thus forming a first alignment film 111.

An opaque light shielding film 113, a color layer 114, a third insulating film 115 and a second alignment film 117 are formed in the name order on a side of the second glass substrate 112, the side facing the first glass substrate 100, so as to interpose the liquid crystal 116 therebetween.

Further, a first polarizer 121 is adhered to the back surface (the side opposite to the surface on which the TFT 103 is formed) of the first glass substrate 100 and a second polarizer 122 to the other side of the second glass substrate 112, thereby completing a liquid crystal display panel 150.

Figure 8:
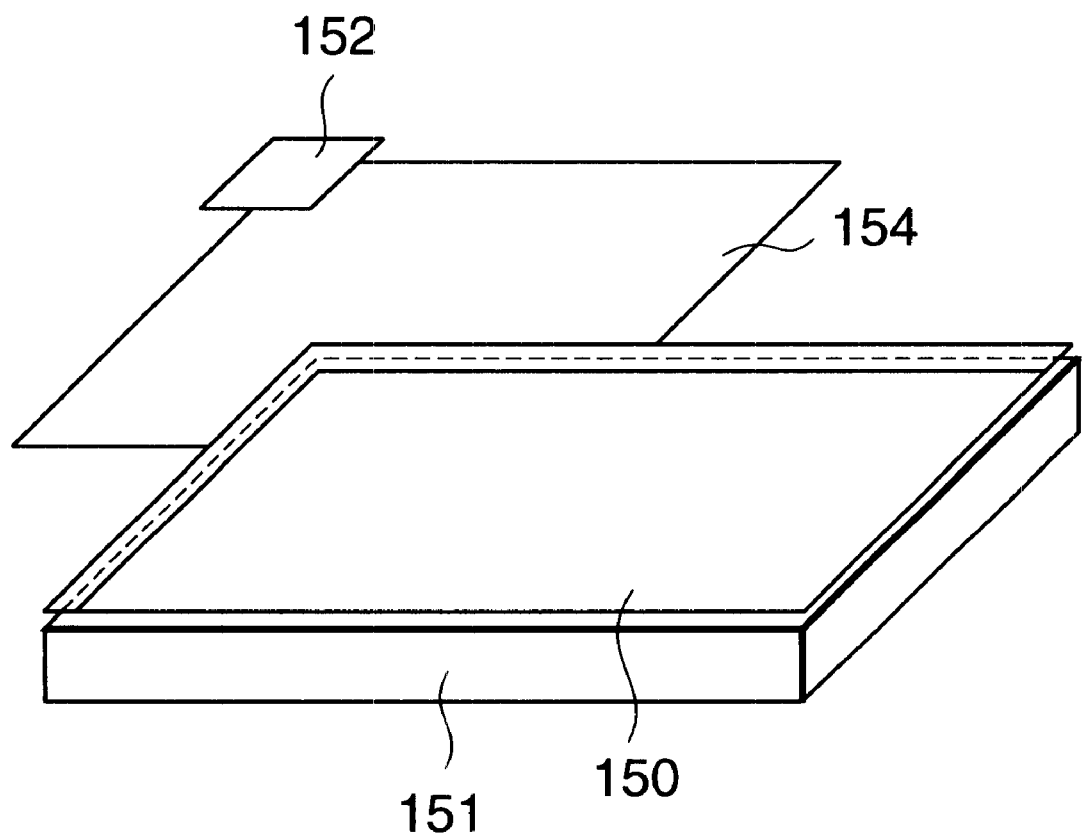
FIG. 8 is a structural diagram for explaining the structure of a liquid crystal drive device.

FIG. 8 presents a perspective view illustrating the positional relationship between the liquid crystal display panel 150 and a backlight 151. The liquid crystal display panel 150 is disposed above the backlight 151 and a liquid crystal drive circuit 152 for driving TFTs of the liquid crystal display panel 150 is connected to the liquid crystal display panel 150 via a wiring 154, thereby completing the liquid crystal display device.

The operation of the active matrix liquid crystal display device according to the first embodiment will now be explained.

The active matrix liquid crystal display device according to the first embodiment operates in a manner similar to that of the conventional active matrix liquid crystal display device as follows: first, a signal from the liquid crystal drive circuit 152 is inputted to the liquid crystal display panel 150; and the TFT 103 disposed in each segment in a matrix form is turned on; and then, an electric field is generated between the source (pixel) electrode 105 and the common electrode 104; and thereafter, the liquid crystal 116 sealed between both substrates 140 and 130 brings about an electro optic effect, changing the light transmittance of the liquid crystal display panel 150; and as a result, light 119 emitted from the backlight 151 undergoes transmittance modulation via the liquid crystal display panel 150 as shown in FIG. 6, so that the light intensity changes pixel by pixel, thereby enabling image display on the device.

With respect to the light incident from the backlight 151 on the liquid crystal display panel 150, the liquid crystal display device according to the embodiment has the following additional structural feature. That is, to reduce the leak current produced by the photocarriers generated in the TFT 103, the optimal overlap length "d" determined by a source or drain electrode overlapping a gate electrode in a channel length direction, and indicated in FIG. 5, is optimized. The operation for optimizing the overlap length "d" will be described in detail below.

Figure 9:
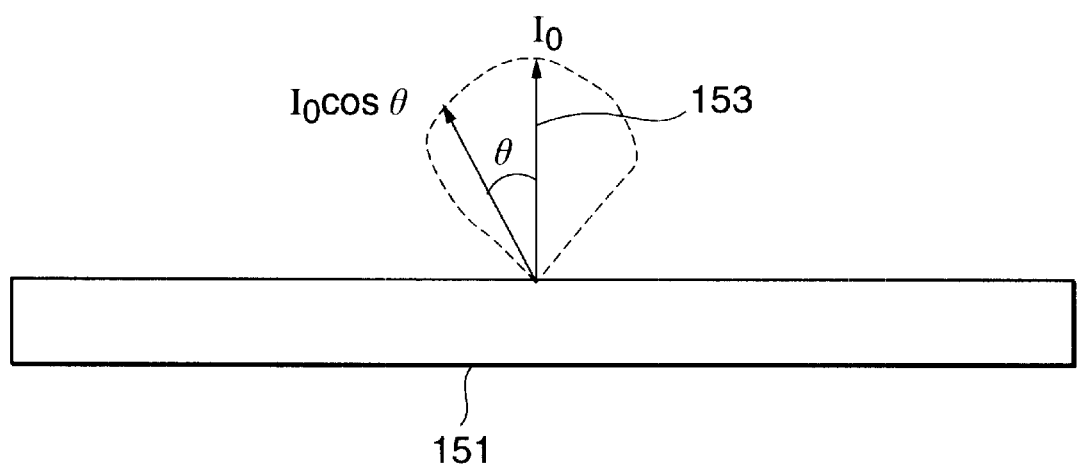
FIG. 9 is an explanatory diagram showing a radial distribution of outgoing light from an ordinary backlight.

FIG. 9 shows the radial distribution of outgoing light from the ordinary backlight 151. Assuming that $I_0$ is the intensity of light outgoing in the radial direction, the light intensity in the direction of a polar angle $\theta_0$ is expressed as $I_0 \cos \theta_0$.

Figure 10:
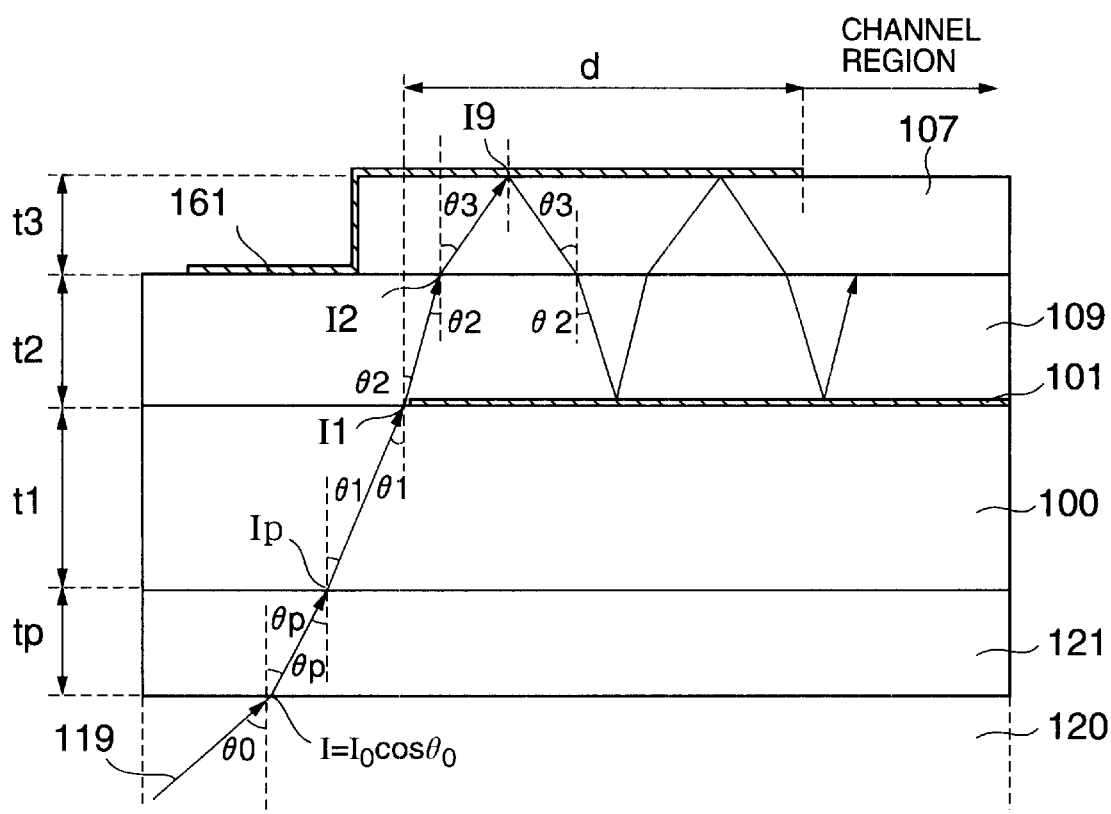
FIG. 10 is an explanatory diagram of a path of light incident on the front channel portion of a thin film transistor.

Assuming the case where outgoing light 153 shown in FIG. 9 from the backlight 151 occurs. FIG. 10 is an enlarged cross-sectional view of the TFT substrate 130 showing the first polarizer 121, the first glass substrate 100, the gate line 101, the first insulating film 109, the amorphous silicon film 107 and the drain electrode 106. Referring to FIG. 10, the path of light entering from the back surface (the backlight side) of the TFT substrate 130 will be analyzed.

As the gate line 101 does not allow light to pass through, the path that passes the end of the gate line 101 is analyzed as the path of the light incident on the channel portion. It should be noted that the incident light 119 on the liquid crystal display panel 150 enters at an angle of $\theta_0$, which is equal to the outgoing angle of light from the backlight 151. When applying the law of refraction (Snell's law) to the light traveling within the liquid crystal display panel 150, the light travels satisfying the following equation 3.

$$n_0 \sin \theta_0 = n_p \sin \theta_p = n_1 \sin \theta_1 = n_2 \sin \theta_2 = n_3 \sin \theta_3 \quad (3)$$

where $n_0$: the refractive index of an air layer 120, $n_p$: the refractive index of the first polarizer, $n_1$: the refractive index of the first glass substrate 100, $n_2$: the refractive index of the first insulating film 109, $n_3$: the refractive index of the amorphous silicon film 107, $\theta_p$: the angle of refraction at the interface between the air layer 120 and the first polarizer 121, $\theta_1$: the angle of refraction at the interface between the first polarizer 121 and the first glass substrate 100, $\theta_2$: the angle of refraction at the interface between the first glass substrate 100 and the first insulating film 109, and $\theta_3$: the angle of refraction at the interface between the first insulating film 109 and the amorphous silicon film 107.

The intensity of light is calculated by using the following equations 4:

$$\left.\begin{array}{l} I_p = T_{0p} \times I \times \exp(-\alpha_p \times t_p / \cos\theta_0) \\ I_1 = T_{p1} \times I_p \times \exp(-\alpha_1 \times t_1 / \cos\theta_1) \\ I_2 = T_{12} \times I_1 \times \exp(-\alpha_2 \times t_2 / \cos\theta_2) \\ I_3 = T_{23} \times I_2 \times \exp(-\alpha_3 \times t_3 / \cos\theta_3), \end{array}\right\} \quad (4)$$

where $\alpha_p$: the optical absorption coefficient of the first polarizer 121, $\alpha_1$: the optical absorption coefficient of the first glass substrate 100, $\alpha_2$: the optical absorption coefficient of the first insulating film 109, and $\alpha_3$: the optical absorption coefficient of the amorphous silicon film 107.

$I_p$, $I_1$, $I_2$ and $I_3$ are intensity of light at the respective positions in FIG. 10.

Computation is further carried out using the following various variables.

$T_{0p}$: the transmittance of the interface between the air layer 120 and the first polarizer 121, $T_{p1}$: the transmittance of the interface between the first polarizer 121 and the first glass substrate 100, $T_{12}$: the transmittance of the interface between the first glass substrate 100 and the first insulating film 109, $T_{23}$: the transmittance of the interface between the first insulating film 109 and the amorphous silicon film 107, $t_p$: the film thickness of the first polarizer 121, $t_1$: the film thickness of the first glass substrate 100, $t_2$: the film thickness of the first insulating film 109, and $t_3$: the film thickness of the amorphous silicon film 107.

The light after the passage through the first polarizer 121, the first glass substrate 100, the first insulating film 109 and the amorphous silicon film 107 to the surface of the drain electrode 106 has the light intensity denoted by $I_3$ is repeatedly reflected and refracted between the gate line 101 and the drain electrode 106 several times and eventually reaches the channel portion. The computation necessary in this stage is performed as follows: first, apply the following equations (6) and (7) to the calculation repeatedly every reflection and refraction between the gate line 101 and the drain electrode 106, additionally using reflectance $R_1$ and $R_3$ at the gate electrode and the drain electrode; and calculate the light intensity repeatedly every reflection and refraction during the travel of the light originally having the intensity of $I_3$ to the channel portion; and when the light travels the distance "d," in other words, reaches the channel portion, calculate the light intensity. Note that the equations (6) and (7) are parts of the equation expressing the law of refraction and the equations expressing the law of optical absorption, respectively.

$$n_2 \sin \theta_2 = n_3 \sin \theta_3 \qquad (6)$$

$$\left. \begin{array}{l} I_2 = T_{12} \times I_1 \times \exp(-\alpha_2 \times t_2 / \cos\theta_2) \\ I_3 = T_{23} \times I_2 \times \exp(-\alpha_3 \times t_3 / \cos\theta_3) \end{array} \right\} \qquad (7)$$

Assuming that $I_n$ is the light intensity at the channel portion, when $I_n$ exceeds a certain level, electron-hole pairs generated by the incident light cannot be neglected and flickering and degradation of the display uniformity due to the leak current become noticeable.

Figure 11:
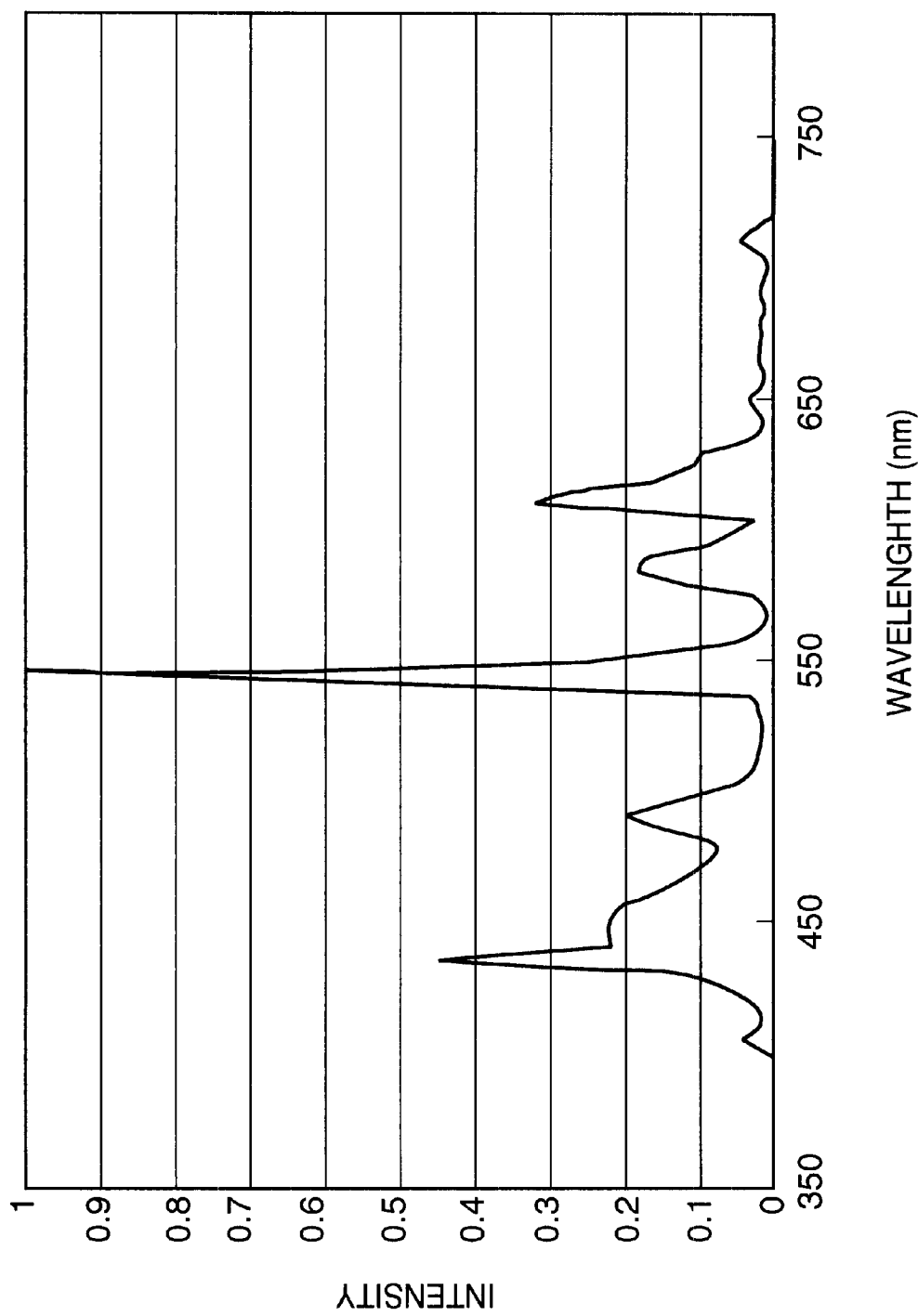
FIG. 11 is a graph showing the spectrum of the backlight.

The result obtained by manufacturing a liquid crystal display device using members having parameters given in Table 1 and then evaluating the same will be explained below. The item included in Table 1 refers to the graph of FIG. 11 showing the spectrum of the backlight.

direction and the intensity "I" of light incident on the channel portion when the outgoing angle $\theta_0$ of the light from the backlight equals to 50 to 70°.

Figure 13:
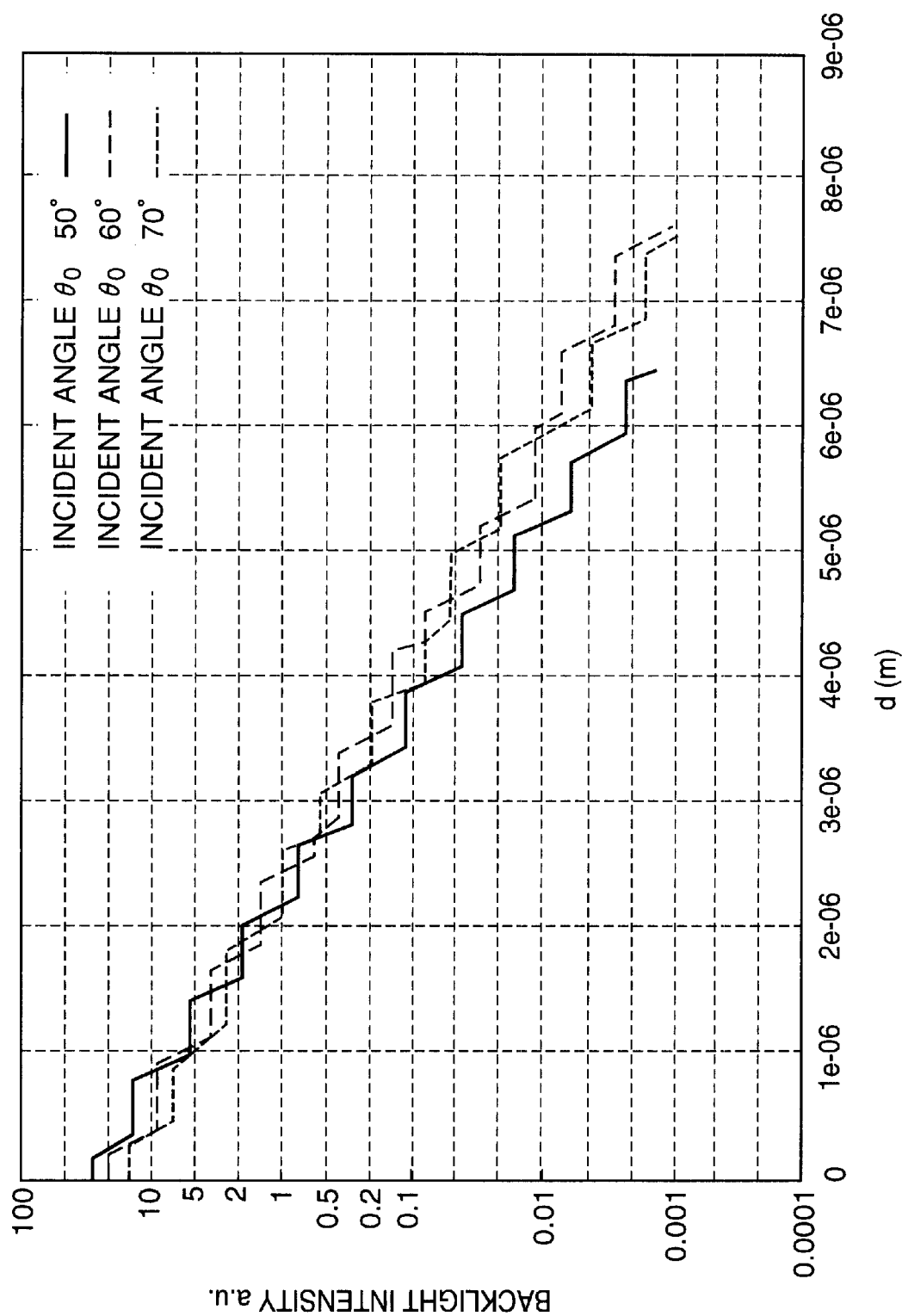
FIG. 13 is a graph illustrating the relationship between the "optimal overlap length 'd' determined by a source or drain electrode overlapping a gate electrode in a channel length direction" and the intensity I of light incident on the channel portion when the outgoing angle $\theta_0$ of light emitted from the backlight equals to 50 to 70°.
Figure 14:
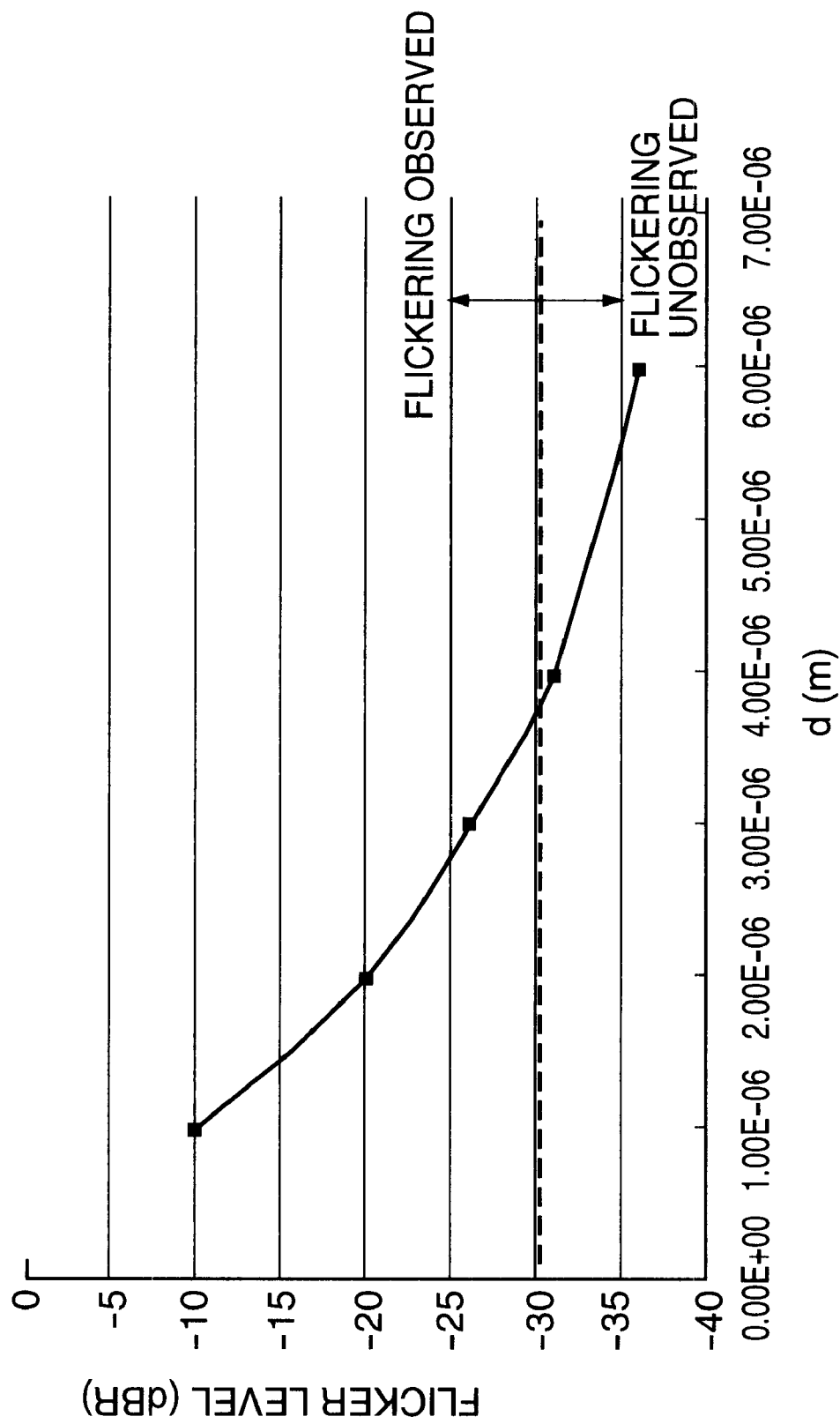
FIG. 14 is a graph illustrating the relationship between the "optimal overlap length 'd' determined by a source or drain electrode overlapping a gate electrode in a channel length direction" and the flicker level (dB)

FIG. 14 is a graph illustrating the relationship between the "optimal overlap length 'd'" determined by a source or drain electrode overlapping a gate electrode in a channel length direction and the flicker level (dB), which was obtained through experiments to date. It should be noted here that the flicker level at which human eyes cannot recognize flickering is equal to or lower than −30 dB, and the "d" corresponding to the above-described value is decided to be 4 μm or greater. When "d" is set at the value of 3 μm, the flicker level is poor. Taking into account of those experiments, the intensity "I" of light incident on the channel portion corresponding to the critical "d," 4 μm or greater has to be approximately 0.2 or lower as is understood from the graph of FIG. 13. That is, when the intensity "$I_0$" of the outgoing light from the backlight is attenuated to 0.2% or less until the light reaches the channel portion, the light-induced OFF leak current generated in the TFT 103 is negligible from the point of view of display characteristic. Additionally, it should be noted that although the flicker level of −30 dB or lower at which human eyes cannot recognize flickering is effective as an absolute critical value, the value of 4 μm or greater optimized as the "optimal overlap length 'd'" of FIG. 14

TABLE 1

Parameters of components constituting the LCD device of the first embodiment

| Symbols | | Units | Values | Note |
|---|---|---|---|---|
| refractive index | $n_0$ | — | 1 | — |
| | $n_p$ | | 1.5 | SQ1852APO (Sumitomo Chemical Co., Ltd.) |
| | $n_1$ | | 1.5 | OA10 (Nippon Electric Glass Co., Ltd.) |
| | $n_2$ | | 1.9 | Silicon nitride |
| | $n_3$ | | 3 | — |
| optical absorption coefficient | $\alpha_p$ | $m^{-1}$ | $7.0 \times 10^2$ | SQ1852APO (Sumitomo Chemical Co., Ltd.) |
| | $\alpha_1$ | | 0 | OA10 (Nippon Electric Glass Co., Ltd.) |
| | $\alpha_2$ | | 0 | — |
| | $\alpha_3$ | | $1.0 \times 10^6$ | — |
| film thickness | $t_p$ | m | $2.2 \times 10^{-3}$ | SQ1852APO (Sumitomo Chemical Co., Ltd.) |
| | $t_1$ | | $7.0 \times 10^{-4}$ | OA10 (Nippon Electric Glass Co., Ltd.) |
| | $t_2$ | | $5.0 \times 10^{-7}$ | — |
| | $t_3$ | | $3.3 \times 10^{-7}$ | — |
| transmittance at each interface | $T_{0p}$ | % | 50 | Measured values |
| | $T_{p1}$ | | 100 | |
| | $T_{12}$ | | 99 | |
| | $T_{23}$ | | 95 | |
| reflectance at metal surface | $R_1$ | $cd/m^2$ | 100 | — |
| | $R_3$ | | 100 | — |
| front luminance of backlight | — | w/($m^2 \cdot$ nm $\cdot$ sr) | 8000 | Measured value |
| spectrum of backlight | — | | FIG. 11 | Measured value |

Figure 12:
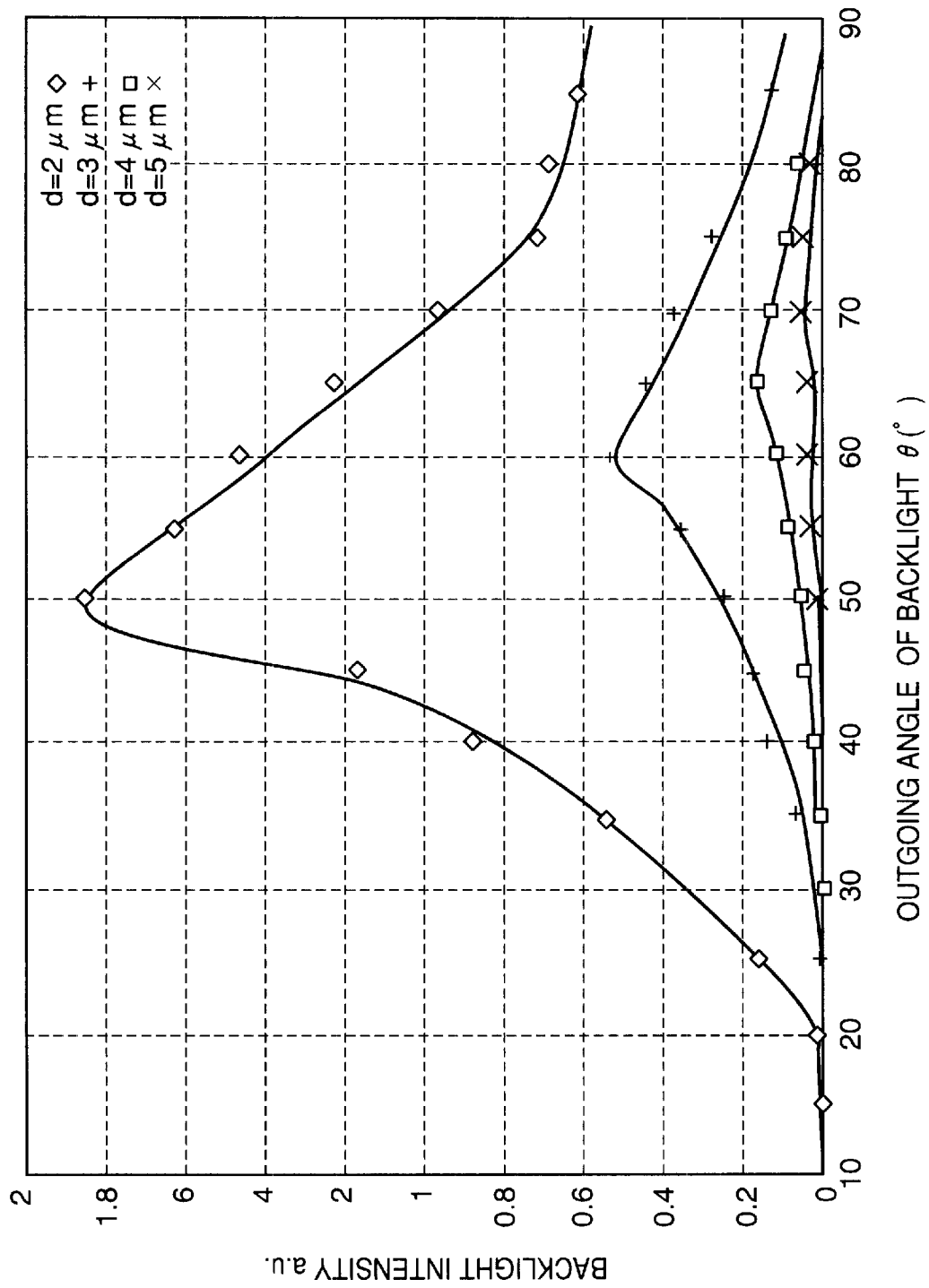
FIG. 12 is a graph illustrating the relationship between the outgoing angle $\theta_0$ of light emitted from the backlight and the intensity I of light incident on the channel portion of a thin film transistor.

FIG. 12 shows the results of computing the relationship between the outgoing angle $\theta_0$ of emerging light from the backlight 151 and the intensity I of light incident on the channel portion with respect to various values of "d" by using the equations (1) and (2). Note that the graph is plotted assuming the outgoing light intensity $I_0$ at the front of the backlight 151 is "100" for convenience. Four curves are drawn while changing the "optimal overlap length 'd'" determined by a source or drain electrode overlapping a gate electrode in a channel length direction within a range (d=2 to 5 μm) for practical manufacturing. It is apparent from FIG. 12 that when the outgoing angle $\theta_0$ of light from the backlight is 50 to 70°, light having the maximum intensity enters the channel portion.

FIG. 13 illustrates the relationship between the "optimal overlap length 'd'" determined by a source or drain electrode overlapping a gate electrode in a channel length determined by a source or drain electrode overlapping a gate electrode in a channel length direction is determined with respect to the value of "−30 dB" as a boundary value, and thus, is a relative value, in other words, naturally changes depending on the materials employed in the manufacturing process of this embodiment.

By reducing the light-induced OFF leak current as a result of the intensity of light incident on the channel portion of the TFT 103, being lowered through the above-described means, the reduction of flickering and the improvement of display uniformity can be realized.

(Second Embodiment)

The second embodiment of the invention will be explained with reference to the accompanying drawings.

Figure 15:
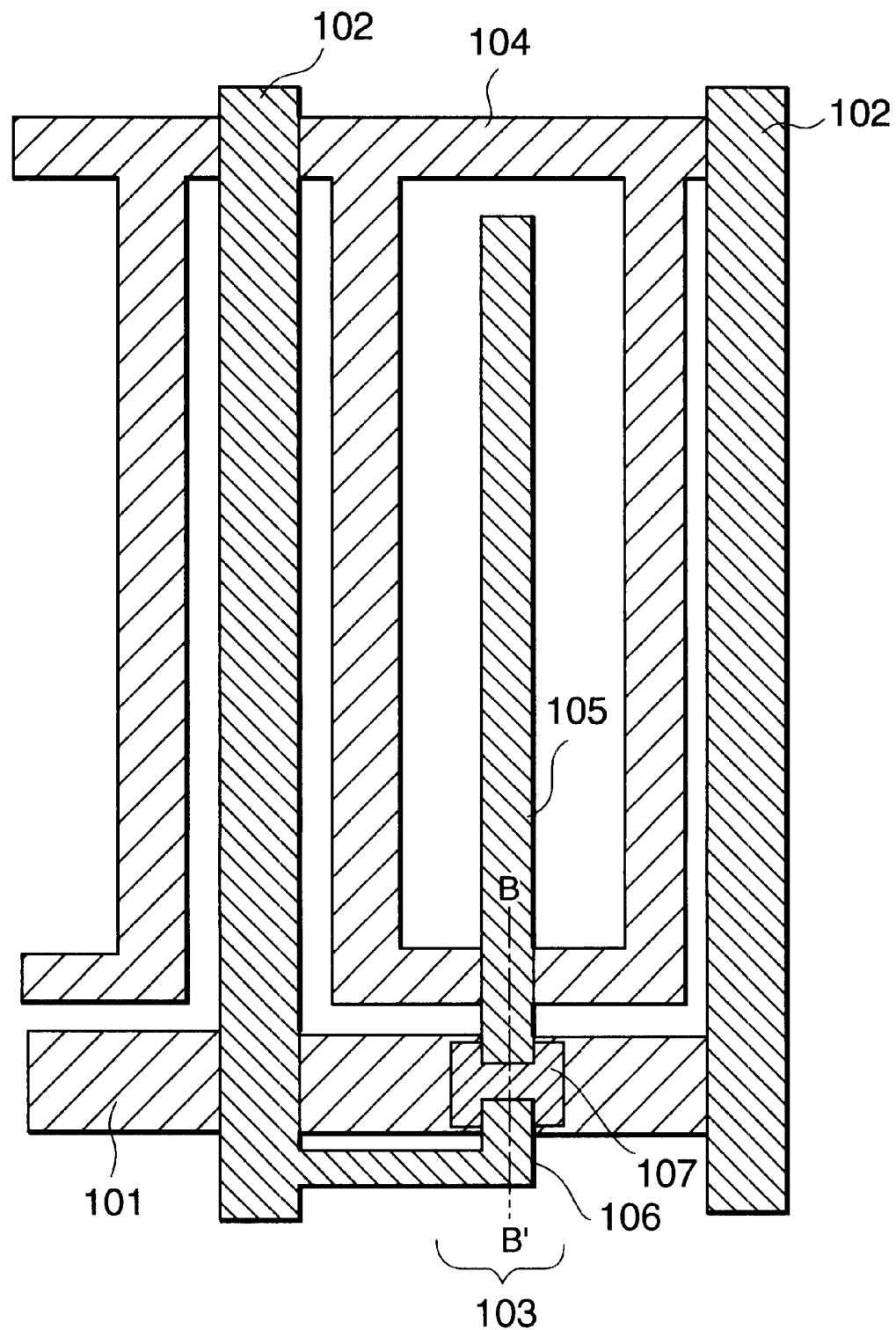
FIG. 15 is a plan view of a unit pixel illustrating a second embodiment of the invention.
Figure 16:
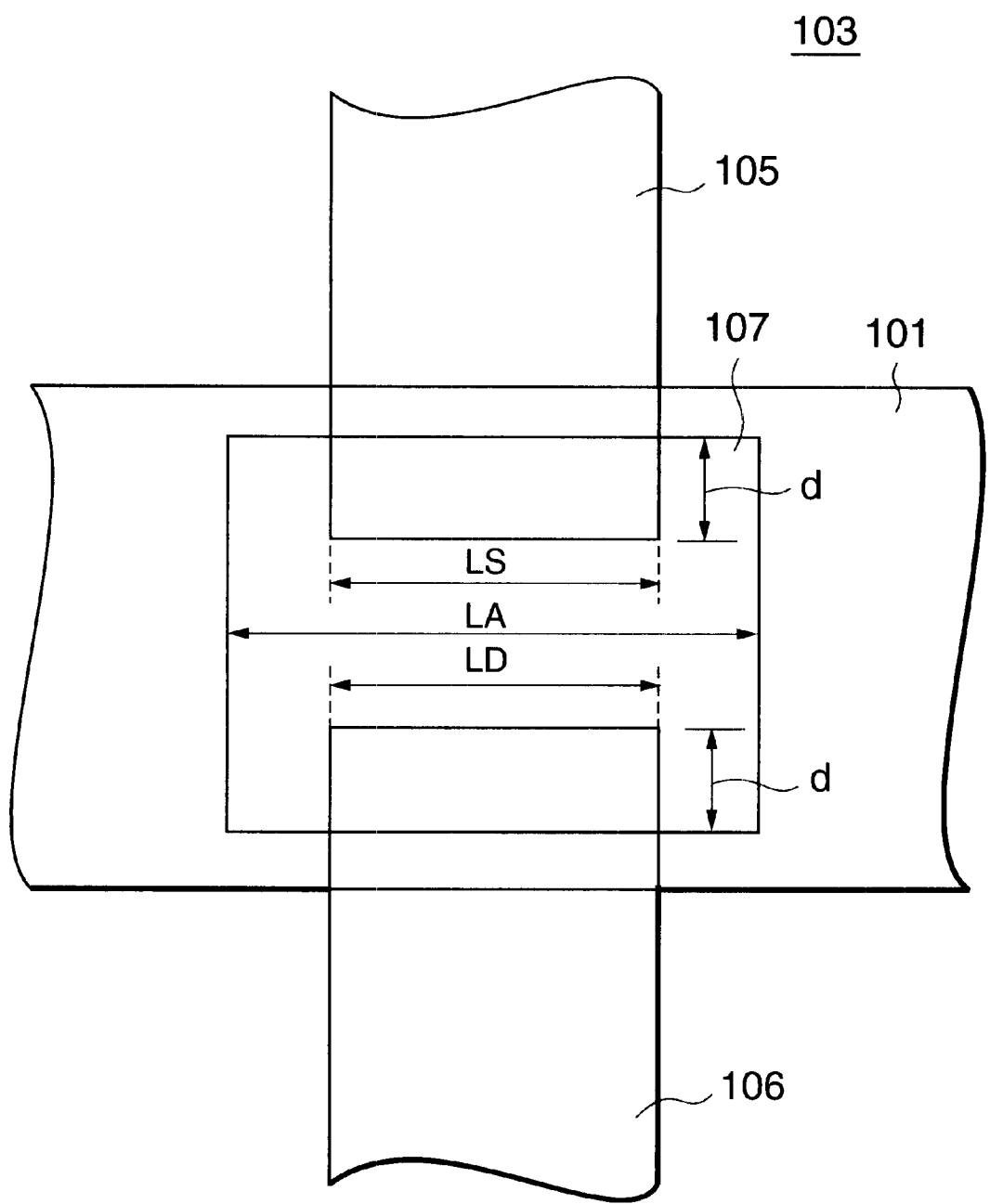
FIG. 16 is a plan view of a thin film transistor portion of the second embodiment of the invention.
Figure 17:
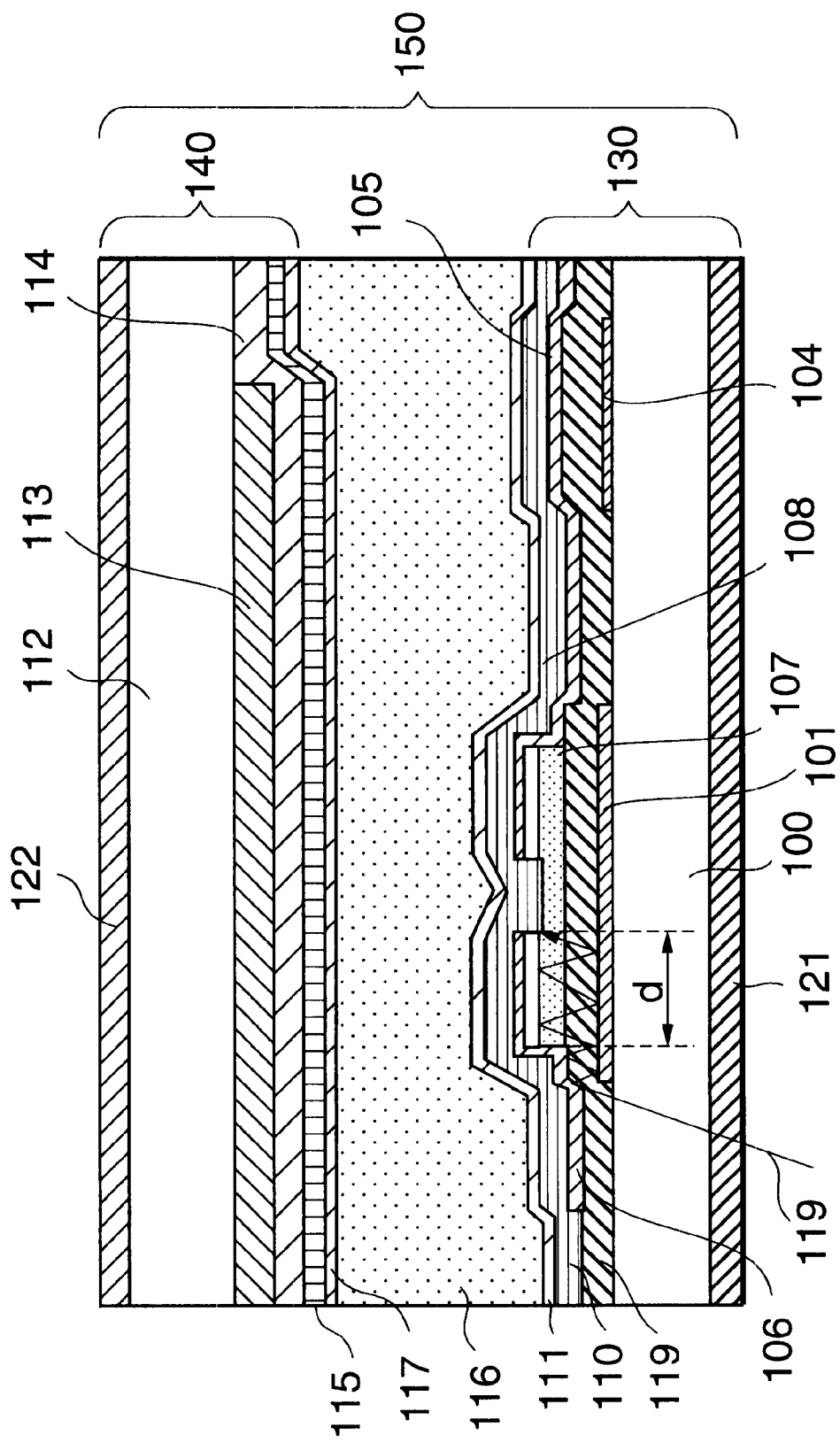
FIG. 17 is a cross-sectional view taken along B–B' in FIG. 15.

FIG. 15 is a plan view of a unit pixel of a TFT substrate 130 of an active matrix liquid crystal display device according to the second embodiment, and shows the portion of the device figured on the lower side of the cross-sectional view of FIG. 6. FIG. 16 is an enlarged plan view of a thin film transistor portion of each unit pixel. FIG. 17 is a cross-sectional view taken along B–B' in FIG. 15, also illustrating the portion of the device opposite to the TFT substrate 130.

The active matrix liquid crystal display device according to the second embodiment illustrated in FIG. 15 is different from the active matrix liquid crystal display device according to the first embodiment illustrated in FIGS. 4 to 6 in the points that the amorphous silicon film 107 is entirely included in the gate line 101. That is, the elements constituting the TFT 103 are formed so as to satisfy the following inclusion relation:

$$[\phi \neq (GID) \not\subset A] U [\phi \neq (GIS) \not\subset A] \qquad (2)$$

where A is an area the amorphous silicon film 107 occupies, G is an area the gate line 101 occupies, D is an area the drain electrode 106 occupies, S is an area the source (pixel) electrode 105 occupies and $\phi$ is an empty set.

The electric operation of the active matrix liquid crystal display device according to the second embodiment is similar to that of the active matrix liquid crystal display device according to the first embodiment. However, the second embodiment is different from the first embodiment as follows: different from the first embodiment, the amorphous silicon film 107 is entirely included in the gate line 101 as shown in the cross-sectional view of FIG. 17 and therefore, light from the backlight passing through the end portion of the gate line 101 toward inside of the device reflects multiple times between the gate line 101 and the drain electrode 106 or between the gate line 101 and the source (pixel) electrode 105 before traveling the distance, "optimal overlap length 'd'," which is determined by a source or drain electrode overlapping a gate electrode in a channel length direction; and as a result, the attenuation of the incident light becomes more noticeable than that achieved by the active matrix liquid crystal display device according to the first embodiment, thereby ensuring greater reduction in flickering and better display uniformity. Conclusively, the optimal overlap length "d" having the same value as that of the first embodiment is sufficient in the second embodiment.

However, there are some drawbacks in the above-described construction as follows: the necessity for designing the amorphous silicon film 107 within the gate line 101 restricts the layout of the pixels; and the significant reduction of light incident on the channel portion acts to lower the on-current of the TFT 103; and as a result, the charges to be supplied to the source (pixel) electrode 105, which is driven by the TFT 103, is not sufficient to drive the same, whereby the desired luminance cannot be obtained. It is therefore preferable to design the liquid crystal display device in consideration of those drawbacks too.

As explained in the foregoing description of the embodiments, the reduction of flickering and the improvement of display uniformity achieved by materially reducing the number of electron-hole pairs in the channel portion are realized in the following manner: first, define "optimal overlap length 'd'," which is determined by a source electrode or a drain electrode overlapping a gate electrode in a channel length direction; and calculate the optimal value "d" using various equations concerning the physical laws and involving physical constants (which are called "variables" in the invention) of the materials constituting the TFT in such a manner that the value "d" is determined by the distance that a light incident from the end of the gate electrode on the inner side of the device travels, the intensity of the light after the traveling sufficiently being attenuated comparing to the incident light by the light absorption primarily seen within the semiconductor region; and finally, apply the value "d" to the layout of TFTs.

Although the foregoing embodiments of the invention employs the structure in which the polarizer is provided on the back surface of the TFT substrate and the light incident on the channel portions of the TFTs of the liquid crystal display device can be reduced, the invention is not limited the above-described structure. That is, it is needless to say that the invention can employ a thin film transistor as a usual switching element, in more detail, a thin film transistor having no polarizer on the back surface of a TFT substrate and further no opposing substrate facing the TFT substrate. In this case, various variables and equations available for the case where the polarizer of the first and second embodiments is not formed on a TFT substrate are applied to the calculation. That is, the switching element having a structure that enables to reduce a light-induced OFF leak current is required to satisfy the following conditions.

The switching element of the invention has a basic construction that a drain electrode or a source (pixel) electrode constituting a TFT is included in an amorphous silicon film in the channel width direction. Specifically, the TFT is formed so as to satisfy the following inclusion relation:

$$[LS \subset LA] \cap [LD \subset LA] \qquad (1)$$

where LD is the width of the drain electrode of the TFT in the channel width direction, LS is the width of the source electrode in the channel width direction, and LA is the electrode width of the semiconductor region in the channel width direction.

Various variables and equations for the case where the polarizer of the first embodiment is not provided on the TFT substrate are applied to this construction of the switching element in the following manner.

When applying the law of refraction (Snell's law) to the light traveling within the liquid crystal display panel 150, the light travels satisfying the following equation 8.

$$n_0 \sin \theta_0 = n_1 \sin \theta_1 = n_2 \sin \theta_2 = n_3 \sin \theta_3 \qquad (8)$$

where $n_0$: the refractive index of an air layer 120,
$n_1$: the refractive index of the first glass substrate 100,
$n_2$: the refractive index of the first insulating film 109,
$n_3$: the refractive index of the amorphous silicon film 107,
$\theta_1$: the angle of refraction at the interface between the air layer 120 and the first glass substrate 100,
$\theta_2$: the angle of refraction at the interface between the first glass substrate 100 and the first insulating film 109, and
$\theta_3$: the angle of refraction at the interface between the first insulating film 109 and the amorphous silicon film 107.

Furthermore, the intensity of light is calculated by using the following equations 9:

$$\left. \begin{aligned} I_1 &= T_{01} \times I \times \exp(-\alpha_1 \times t_1 / \cos\theta_1) \\ I_2 &= T_{12} \times I_1 \times \exp(-\alpha_2 \times t_2 / \cos\theta_2) \\ I_3 &= T_{23} \times I_2 \times \exp(-\alpha_3 \times t_3 / \cos\theta_3) \end{aligned} \right\} \qquad (9)$$

where $\alpha_1$: the optical absorption coefficient of the first glass substrate 100,
$\alpha_2$: the optical absorption coefficient of the first insulating film 109, and
$\alpha_3$: the optical absorption coefficient of the amorphous silicon film 107.

$I_1$, $I_2$ and $I_3$ are intensity of light at the respective positions of the structure constructed by removing the part denoted by the numeral "121" from the structure shown in FIG. 10. The followings are other variables used in the equations 9.

$T_{01}$: the transmittance of the interface between the air layer 120 and the first glass substrate 100, $T_{12}$: the transmittance of the interface between the first glass substrate 100 and the first insulating film 109, $T_{23}$: the transmittance of the interface between the first insulating film 109 and the amorphous silicon film 107, $t_1$: the film thickness of the first glass substrate 100, $t_2$: the film thickness of the first insulating film 109, and $t_3$: the film thickness of the amorphous silicon film 107.

The light after the passage through the first glass substrate 100, the first insulating film 109 and the amorphous silicon film 107 to the surface of the drain electrode 106 has the light intensity denoted by "$I_3$" is repeatedly reflected and refracted between the gate line 101 and the drain electrode 106 several times and eventually reaches the channel portion. The computation necessary in this stage is performed as follows: first, apply the following equations (6) and (7) to the calculation repeatedly every reflection and refraction between the gate line 101 and the drain electrode 106, additionally using reflectance $R_1$ and $R_3$ at the gate electrode and the drain electrode; and calculate the light intensity repeatedly every reflection and refraction during the travel of the light originally having the intensity of $I_3$ to the channel portion; and when the light travels the distance "d", in other words, reaches the channel portion, calculate the light intensity. Note that the equations (6) and (7) are parts of the equation expressing the law of refraction and the equations expressing the law of optical absorption, respectively.

$$n_2 \sin \theta_2 = n_3 \sin \theta_3 \tag{6}$$

$$\left. \begin{array}{l} I_2 = T_{12} \times I_1 \times \exp(-\alpha_2 \times t_2 / \cos\theta_2) \\ I_3 = T_{23} \times I_2 \times \exp(-\alpha_3 \times t_3 / \cos\theta_3) \end{array} \right\} \tag{7}$$

Assuming that $I_n$ is the light intensity at the channel portion, when $I_n$ exceeds a certain level, electron-hole pairs generated by the incident light cannot be neglected and flickering and degradation of the display uniformity due to the leak current become noticeable.

Although preferable embodiments of the invention have been described above, the invention is not limited to those embodiments but may employ various other or modified structures. For example, the optimization of the overlap length determined by a source electrode or drain electrode overlapping a gate electrode in a channel length direction of the TFT portion according to the invention can also be applied to semiconductor regions other than the amorphous silicon film, for instance, a polysilicon film. Furthermore, the invention can also be applied to a multi-domain liquid crystal cell having at least two domains, in which alignment layers corresponding to the domains have different pretilts, and being employed to improve the contrast ratio depending on the viewing angle direction in the display device that requires high image quality, in other words, low flickering and low unevenness of luminance especially when operating in the lateral electric field mode.

The invention is not limited to a transparent type liquid crystal display device which uses the above-described backlight or a sidelight, but may be employed in a reflection type liquid crystal display device which uses TFTs but does not need a backlight, and further a semitransparent/semi-reflection type liquid crystal display device having the functions of both the transparent type and reflection type. Furthermore, the invention can be applied to an EL (Electro Luminescence) display device as well as a liquid crystal display device. Moreover, metals other than Cr, such as Al, Mo and Ta, can be used for the gate line, the drain line and the other individual electrodes.

As described above, in the active matrix liquid crystal display device of the invention that has an TFT substrate comprising a plurality of gate lines formed on a glass substrate, a plurality of drain lines formed so as to cross the gate lines, TFTs formed near each cross point of the gate lines and the drain lines, a source (pixel) electrode connected to each of the TFTs and a common electrode formed so as to face the source (pixel) electrode, the light-induced OFF leak current due to the generation of electron-hole pairs in amorphous silicon caused by the light incident on the channel portion can be suppressed sufficiently to improve flickering and display uniformity by securing an optimal overlap length "d" determined by a source or drain electrode overlapping a gate electrode in a channel length direction in a channel length direction. In more detail, the optimal overlap length "d" is obtained by calculating a distance that the light travels toward the channel portion, the distance being determined for the light after the travel of the distance "d" to become 0.2% or less of the intensity "$I_0$" of the outgoing light from the backlight. In order to calculate the optimal overlap length "d," the following equations, the Snell's equation 3 and the equations 4 concerning the optical absorption, and further the reflectance $R_1$ at the gate line surface and the reflectance $R_3$ at the drain electrode surface are utilized.

$$n_0 \sin \theta_0 = n_p \sin \theta_p = n_1 \sin \theta_1 = n_2 \sin \theta_2 = n_3 \sin \theta_3 \tag{3}$$

$$\left. \begin{array}{l} I_p = T_{0p} \times I \times \exp(-\alpha_p \times t_p / \cos\theta_0) \\ I_1 = T_{p1} \times I_p \times \exp(-\alpha_1 \times t_1 / \cos\theta_1) \\ I_2 = T_{12} \times I_1 \times \exp(-\alpha_2 \times t_2 / \cos\theta_2) \\ I_3 = T_{23} \times I_2 \times \exp(-\alpha_3 \times t_3 / \cos\theta_3), \end{array} \right\} \tag{4}$$

What is claimed is:

1. An active matrix liquid crystal display device comprising:

a thin-film-transistor array substrate having thin film transistors formed on one surface of a substrate and a polarizer formed on the other surface of said substrate, each of said thin film transistors including a semiconductor region formed on an insulating film covering a gate electrode formed on said substrate, and a source electrode and a drain electrode formed apart from each other on both end portions of said semiconductor region so as to partly overlap said semiconductor region and extending on said insulating film, said source electrode and said drain electrode being formed in such a manner that widths of said source electrode and said drain electrode in a channel width direction are included in a width of said semiconductor region in said channel width direction, while both a planar source-side overlap area constructed by said gate electrode, said source electrode and said semiconductor region and a planar drain-side overlap area constructed by said gate electrode, said drain electrode and said semiconductor region axe provided such that an optimal overlap length of one of said source-side and said drain-side overlap areas in a channel length direction is determined for a light incident on a channel portion of each of said thin film transistors to have a light intensity of below or equal to 0.2% of a light intensity of a backlight incident on said substrate;

an opposing substrate disposed to face said thin-film-transistor array substrate; and a liquid crystal sandwiched between said thin-film-transistor ray substrate and said opposing substrate.

2. The active matrix liquid crystal display device according to claim 1, wherein said semiconductor region is formed so as to be included in said gate electrode in said channel length direction.

3. The active matrix liquid crystal display device according to claim 1, wherein said liquid crystal is driven by an electric field generated on said thin-film-transistor array substrate and being approximately in parallel to said thin-film-transistor array substrate.

4. The active matrix liquid crystal display device according to claim 3, wherein said electric field approximately in parallel to said thin-film-transistor array substrate is applied in two directions.

5. The active matrix liquid crystal display device according to claim 1, wherein said liquid crystal is driven by an electric field generated on said thin-film-transistor array substrate and being approximately perpendicular to said thin-film-transistor array substrate.

6. The active matrix liquid crystal display device according to claim 1, wherein said optimal overlap length of one of said source-side overlapping and said drain-side overlap areas in said channel length direction is further determined so as to satisfy the value of −30 dB or lower as a flicker output level defined as a maximum value of an intensity of a light at said channel portion of each of said thin film transistors, said light originally being emitted from said backlight at every angle to said liquid crystal display.

7. The active matrix liquid crystal display device according to claim 6, wherein said semiconductor region is formed so as to be included in said gate electrode in said channel length direction.

8. The active matrix liquid crystal display device according to claim 6, wherein said liquid crystal is driven by an electric field generated on said thin-film-transistor ray substrate and being approximately in parallel to said thin-film-transistor array substrate.

9. The active matrix liquid crystal display device according to claim 8, wherein said electric field approximately in parallel to said thin-film-transistor array substrate is applied in two directions.

10. The active matrix liquid crystal display device according to claim 6, wherein said liquid crystal is driven by an electric field generated on said thin-film-transistor array substrate and being approximately perpendicular to said thin-film-transistor ray substrate.

11. The active matrix liquid crystal display device according to claim 1, wherein said light intensity at said channel portion of each of said thin film transistors is obtained by calculating unknown variables based on various variables and following equations and subjecting to following procedures and said optimal overlap length of one of said source-side and drain-side overlap areas in said channel length direction is determined for a light incident on a channel portion of each of said thin film transistors to have a light intensity below or equal to 0.2% of a light intensity of said backlight-light emitted from said backlight, said equations using following variables:
$\alpha_p$: an optical absorption coefficient of said polarizer,
$\alpha_1$: an optical absorption coefficient of said substrate,
$\alpha_2$: an optical absorption coefficient of an insulating film,
$\alpha_3$: an optical absorption coefficient of said semiconductor region,
$T_{0p}$: a transmittance of an interface between an air layer and said polarizer,
$T_{p1}$: a transmittance of an interface between said polarizer and said substrate,
$T_{12}$: a transmittance of an interface between said substrate and said insulating film,
$T_{23}$: a transmittance of an interface between said insulating film and said semiconductor region,
$n_0$: a refractive index of said air layer,
$n_p$: a refractive index of said polarizer,
$n_1$: a refractive index of said substrate,
$n_2$: a refractive index of said insulating film,
$n_3$: a refractive index of said semiconductor region,
$R_1$: a reflectance of a metal material for a gate line,
$R_3$: a reflectance of a metal material for one of said drain electrode and said source electrode,
$t_p$: a film thickness of said polarizer,
$t_1$: a film thickness of said substrate,
$t_2$: a film thickness of said insulating film,
$t_3$: a film thickness of said semiconductor region,
$I_0$: an intensity of light emitted from said backlight in a normal direction, and
d: a length of an area defined by one of said source and drain electrodes overlapping said gate line in said channel length direction, said equations including an equation (3) expressing a law of refraction, an equation (4) expressing optical absorption, and an equation (5) expressing a radial distribution of a backlight intensity as follows:

$$n_0 \sin\theta_0 = n_p \sin\theta_p = n_1 \sin\theta_1 = n_2 \sin\theta_2 = n_3 \sin\theta_3 \quad (3),$$

$$\left.\begin{aligned} I_p &= T_{0p} \times I \times \exp(-\alpha_p \times t_p / \cos\theta_0) \\ I_1 &= T_{p1} \times I_p \times \exp(-\alpha_1 \times t_1 / \cos\theta_1) \\ I_2 &= T_{12} \times I_1 \times \exp(-\alpha_2 \times t_2 / \cos\theta_2) \\ I_3 &= T_{23} \times I_2 \times \exp(-\alpha_3 \times t_3 / \cos\theta_3), \end{aligned}\right\} \quad (4)$$

$$I = I_0 \times \cos\theta_0 \quad (5),$$

said unknown variables including following items being calculated in order:
I: an intensity of light incident to said polarizer,
$I_p$: an intensity of light incident to said substrate,
$I_1$: an intensity of light incident to said insulating film,
$I_2$: an intensity of light incident to said semiconductor region,
$I_3$: an intensity of a reflected light after passing through said semiconductor region,
$\theta_p$: an incident angle of light to said substrate from said polarizer,
$\theta_1$: an incident angle of light to said insulating film from said substrate,
$\theta_2$: an incident angle of light to said semiconductor region from said insulating film, and
$\theta_3$: an outgoing angle of light to said semiconductor region from said insulating film, and further, said equations including an equation (6) expressing a part of said law of refraction and an equation (7) expressing said law of optical absorption as follows:

$$n_2 \sin \theta_2 = n_3 \sin \theta_3 \quad (6),$$

$$\left. \begin{array}{l} I_2 = T_{12} \times I_1 \times \exp(-\alpha_2 \times t_2 / \cos\theta_2) \\ I_3 = T_{23} \times I_2 \times \exp(-\alpha_3 \times t_3 / \cos\theta_3), \end{array} \right\} \quad (7)$$

and said optimal overlap length being determined by applying said equations (6) and (7) to repeatedly calculate every reflection and refraction between said gate line and said drain electrode, additionally using reflectance $R_1$ and $R_3$ at said gate electrode and said drain electrode, respectively, by repeatedly calculating a light intensity at every reflection and refraction during a travel of light originally having an intensity of $I_3$ to said channel portion and finally calculating said light intensity at said channel portion.

12. The active matrix liquid crystal display device according to claim 11, wherein said semiconductor region is formed so as to be included in said gate electrode in said channel length direction.

13. The active matrix liquid crystal display device according to claim 11, wherein said liquid crystal is driven by an electric field generated on said thin-film-transistor array substrate and being approximately in parallel to said thin-film-transistor array substrate.

14. The active matrix liquid crystal display device according to claim 13, wherein said electric field approximately in parallel to said thin-film-transistor array substrate is applied in two directions.

15. The active matrix liquid crystal display device according to claim 11, wherein said liquid crystal is driven by an electric field generated on said thin-film-transistor array substrate and being approximately perpendicular to said thin-film-transistor array substrate.

16. A switching element comprising:
a gate electrode formed on a substrate;
an insulating film covering said gate electrode;
a semiconductor region formed over said gate electrode and on said insulating film; and
a source electrode and a drain electrode formed apart from each other on both end portions of said semiconductor region so as to partly overlap said semiconductor region and extending on said insulating film, said source electrode and said drain electrode being formed in such a manner that widths of said source electrode and said drain electrode in a channel width direction are included in a width of said semiconductor region in said channel width direction, while both a planar source-side overlap area constructed by said gate electrode, said source electrode and said semiconductor region and a planar drain-side overlap area constructed by said gate electrode, said drain electrode and said semiconductor region are provided such that an optimal overlap length of one of said source-side and said drain-side overlap areas in a channel length direction is determined for a light incident on a channel portion of each of said thin film transistors to have a light intensity of below or equal to 0.2% of a light intensity of a backlight incident on said substrate.

17. The switching element according to claim 16, wherein a width of said semiconductor region in said channel length direction is wider than that of said gate electrode in said channel length direction and said semiconductor region is formed so as to extend beyond said gate electrode in said channel length direction.

18. The switching element according to claim 16, wherein said light intensity at said channel portion of said switching element is obtained by calculating unknown variables based on various variables and following equations and subjecting to following procedures and said optimal overlap length of one of said source-side and drain-side overlap areas in said channel length direction is determined for a light incident on a channel portion of said switching element to have a light intensity below or equal to 0.2% of a light intensity of said backlight incident on said substrate, said equations using following variables:
$\alpha_1$: an optical absorption coefficient of said substrate,
$\alpha_2$: an optical absorption coefficient of said insulating film,
$\alpha_3$: an optical absorption coefficient of said semiconductor region,
$T_{01}$: a transmittance of an interface between an air layer and said substrate,
$T_{12}$: a transmittance of an interface between said substrate and said insulating film,
$T_{23}$: a transmittance of an interface between said insulating film and said semiconductor region,
$n_0$: a refractive index of said air layer,
$n_1$: a refractive index of said substrate,
$n_2$: a refractive index of said insulating film,
$n_3$: a refractive index of said semiconductor region,
$R_1$: a reflectance of a metal material for a gate line,
$R_3$: a reflectance of a metal material for said drain electrode or said source electrode,
$t_1$: a film thickness of said substrate,
$t_2$: a film thickness of said insulating film,
$t_3$: a film thickness of said semiconductor region,
$I_0$: an intensity of light emitted from said air layer in a normal direction toward said other surface of said substrate, and
d: a length of an area defined by one of said source and drain electrodes overlapping said gate line in said channel length direction, said equations including an equation (8) expressing a law of refraction, an equation (9) expressing optical absorption, and an equation (5) expressing a radial distribution of a backlight intensity as follows:

$$n_0 \sin \theta_0 = n_1 \sin \theta_1 = n_2 \sin \theta_2 = n_3 \sin \theta_3 \quad (8),$$

$$\left. \begin{array}{l} I_1 = T_{01} \times I \times \exp(-\alpha_1 \times t_1 / \cos\theta_1) \\ I_2 = T_{12} \times I_1 \times \exp(-\alpha_2 \times t_2 / \cos\theta_2) \\ I_3 = T_{23} \times I_2 \times \exp(-\alpha_3 \times t_3 / \cos\theta_3), \end{array} \right\} \quad (9)$$

$$I = I_0 \times \cos \theta_0 \quad (5),$$

said unknown variables including following items being calculated in order:
$I_0$: an intensity of light incident to said substrate,
$I_1$: an intensity of light incident to said insulating film,
$I_2$: an intensity of light incident to said semiconductor region,
$I_3$: an intensity of a reflected light after passing through said semiconductor region,
$\theta_0$: an incident angle of light to said substrate from said air layer,
$\theta_1$: an incident angle of light to said insulating film from said substrate,
$\theta_2$: an incident angle of light to said semiconductor region from said insulating film, and
$\theta_3$: an outgoing angle of light to said semiconductor region from said insulating film, and said equations including an equation (6) expressing a part of said law of refraction and an equation (7) expressing said law of optical absorption as follows:

$$n_2 \sin \theta_2 = n_3 \sin \theta_3 \qquad (6),$$

$$\left. \begin{array}{l} I_2 = T_{12} \times I_1 \times \exp(-\alpha_2 \times t_2 / \cos\theta_2) \\ I_3 = T_{23} \times I_2 \times \exp(-\alpha_3 \times t_3 / \cos\theta_3), \end{array} \right\} \qquad (7)$$

and said optimal overlap length being determined by applying said equations (6) and (7) to repeatedly calculate every reflection and refraction between said gate line and said drain electrode, additionally using reflectance $R_1$ and $R_3$ at said gate electrode and said drain electrode, respectively, by repeatedly calculating a light intensity at every reflection and refraction during a travel of light originally having an intensity of $I_3$ to said channel portion and finally calculating said light intensity at said channel portion.

19. The switching element according to claim 18, wherein a width of said semiconductor region in said channel length direction is wider than that of said gate electrode in said channel length direction and said semiconductor region is fanned so as to extend beyond said gate electrode in said channel length direction.

20. The switching element according to claim 18, wherein a width of said semiconductor region in said channel length direction is narrower than that of said gate electrode in said channel length direction and said semiconductor region is fanned so as to be included in said gate electrode in said channel length direction.

* * * * *